United States Patent
Madan et al.

(10) Patent No.: US 9,179,382 B2
(45) Date of Patent: Nov. 3, 2015

(54) METHODS AND APPARATUS FOR SUPPORTING WAN AND D2D COMMUNICATION RLC LAYER HANDOVER

(75) Inventors: Ritesh K. Madan, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 13/476,523

(22) Filed: May 21, 2012

(65) Prior Publication Data

US 2013/0308598 A1 Nov. 21, 2013

(51) Int. Cl.
*H04W 4/00* (2009.01)
*H04W 36/14* (2009.01)
*H04W 36/02* (2009.01)
*H04W 36/18* (2009.01)

(52) U.S. Cl.
CPC .............. *H04W 36/14* (2013.01); *H04W 36/02* (2013.01); *H04W 36/18* (2013.01)

(58) Field of Classification Search
None
See application file for complete search history.

(56) References Cited

U.S. PATENT DOCUMENTS

| 7,398,088 | B2 | 7/2008 | Belkin et al. |
| 2010/0009675 | A1 | 1/2010 | Wijting et al. |
| 2010/0260101 | A1 | 10/2010 | Tsirtsis et al. |
| 2010/0329209 | A1 | 12/2010 | Akselsen |
| 2011/0159799 | A1* | 6/2011 | Chen et al. .................. 455/3.01 |
| 2013/0058272 | A1* | 3/2013 | Adjakple et al. ............. 370/315 |
| 2014/0185587 | A1* | 7/2014 | Jang et al. .................... 370/331 |
| 2014/0235234 | A1* | 8/2014 | Jang et al. .................. 455/426.1 |
| 2014/0308954 | A1* | 10/2014 | Wang et al. .................. 455/436 |

FOREIGN PATENT DOCUMENTS

| WO | 0162026 A1 | 8/2001 |
| WO | 2010102668 A1 | 9/2010 |
| WO | WO2011109027 A1 | 9/2011 |
| WO | 2012048464 A1 | 4/2012 |

OTHER PUBLICATIONS

International Search Report and Written Opinion—PCT/US2013/042055—ISA/EPO—Nov. 27, 2013.

* cited by examiner

*Primary Examiner* — Jutai Kao
(74) *Attorney, Agent, or Firm* — James K. O'Hare

(57) ABSTRACT

A method, an apparatus, and a computer program product for supporting RLC layer handover between WAN supported D2D communications and direct D2D communications. In one example, a first UE may be operable to transmit a WAN handover request including a peer identifier and a cell identifier associated with a second UE to an eNB, where the first UE and the second UE are engaged in direct D2D communications. The eNB may be equipped to communicate the WAN handover request to a second eNB associated with the second UE and receive a RLC parameter indicating a last successful reception by the second UE. The eNB may transmit the RLC parameter to the first UE. The first UE may be equipped to determine a subsequent content item based on the received RLC parameter and may transmit the subsequent content item to the second UE via the eNB.

26 Claims, 21 Drawing Sheets

METHODS AND APPARATUS FOR SUPPORTING WAN AND D2D COMMUNICATION RLC LAYER HANDOVER

BACKGROUND

1. Field

The present disclosure relates generally to communication systems, and more particularly, to a system to support radio link control (RLC) layer handover between wide area network (WAN) supported device to device (D2D) communications and direct D2D communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

The wireless communications system may include a plurality UEs and a plurality of evolved NodeBs (eNBs). The UEs may be associated with difference eNBs and the eNBs may be associated with different cells in a WAN. UEs may engage in D2D communications. Such D2D communications may be direct between UEs and/or supported by one or more eNBs in the WAN. Currently, handover of communications across eNBs is enabled using LTE tunneling of the PDCP context from one eNB to another. The LTE tunneling further involves setting up radio bearers in the new cell. Implementation of this handover process for handover between D2D communications and WAN support D2D communications, and back, results in the loss of the RLC layer state and entails a larger overhead and more latency that is necessary for handing off a D2D connection to the WAN or vice versa, especially when the UEs are in RRC connected states in their respective cells (which may be the same cell). As such, a method and apparatus for supporting RLC layer handover between WAN supported D2D communications and direct D2D communications is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with supporting RLC layer handover between WAN supported D2D communications and direct D2D communications. In one example, a first UE may be operable to transmit a WAN handover request including a peer identifier and a cell identifier associated with a second UE to an eNB, where the first UE and the second UE are engaged in direct D2D communications. The eNB may be equipped to communicate the WAN handover request to a second eNB associated with the second UE and in response, receive a RLC parameter indicating a last successful reception by the second UE. The eNB may transmit the RLC parameter to the first UE. The first UE may be equipped to determine a subsequent content item to transmit to the second UE based on the received RLC parameter and may transmit the subsequent content item to the second UE via the eNB.

According to related aspects, a method for supporting RLC layer handover between WAN supported D2D communications and direct D2D communications is provided. The method can include transmitting, by a first UE, a WAN handover request to an eNB. In one aspect, the WAN handover request may include a peer identifier and a cell identifier associated with a second UE. In one the first UE and the second UE may be in a connected state engaged in direct device to device (D2D) communications. Moreover, the method can include receiving a RLC parameter indicating a last successful reception by the second UE.

Another aspect relates to a wireless communications apparatus. The wireless communications apparatus can include means for transmitting, by a first UE, a WAN handover request to an eNB. In one aspect, the WAN handover request may include a peer identifier and a cell identifier associated with a second UE. In one the first UE and the second UE may be in a connected state engaged in direct device to device (D2D) communications. Moreover, the wireless communications apparatus can include means for receiving a RLC parameter indicating a last successful reception by the second UE.

Another aspect relates to a wireless communications apparatus. The apparatus can include a processing system configured to transmit, by a first UE, a WAN handover request to an eNB. In one aspect, the WAN handover request may include a peer identifier and a cell identifier associated with a second UE. In one the first UE and the second UE may be in a connected state engaged in direct device to device (D2D) communications. Moreover, the processing system may be configured to receive a RLC parameter indicating a last successful reception by the second UE.

Another aspect relates to a computer program product, which can have a computer-readable medium comprising code for transmitting, by a first UE, a WAN handover request to an eNB. In one aspect, the WAN handover request may include a peer identifier and a cell identifier associated with a second UE. In one the first UE and the second UE may be in a connected state engaged in direct device to device (D2D) communications. Moreover, the computer-readable medium can include code for receiving a RLC parameter indicating a last successful reception by the second UE.

According to another related aspect, a method for supporting RLC layer handover between WAN supported D2D communications and direct D2D communications is provided. The method can include transmitting, by a first UE, a D2D handover request through a WAN. In one aspect, the D2D handover request may include a peer identifier and a cell identifier associated with a second UE. In one aspect, the first UE and the second UE may be in a connected state through the WAN. Moreover, the method can include receiving a RLC parameter indicating a last successful reception by the second UE.

Another aspect relates to a wireless communications apparatus. The wireless communications apparatus can include means for transmitting, by a first UE, a D2D handover request through a WAN. In one aspect, the D2D handover request may include a peer identifier and a cell identifier associated with a second UE. In one aspect, the first UE and the second UE may be in a connected state through the WAN. Moreover, the wireless communications apparatus can include means for receiving a RLC parameter indicating a last successful reception by the second UE.

Another aspect relates to a wireless communications apparatus. The apparatus can include a processing system configured to transmit, by a first UE, a D2D handover request through a WAN. In one aspect, the D2D handover request may include a peer identifier and a cell identifier associated with a second UE. In one aspect, the first UE and the second UE may be in a connected state through the WAN. Moreover, the processing system may be configured to receive a RLC parameter indicating a last successful reception by the second UE.

Another aspect relates to a computer program product, which can have a computer-readable medium comprising code for transmitting, by a first UE, a D2D handover request through a WAN. In one aspect, the D2D handover request may include a peer identifier and a cell identifier associated with a second UE. In one aspect, the first UE and the second UE may be in a connected state through the WAN. Moreover, the computer-readable medium can include code for receiving a RLC parameter indicating a last successful reception by the second UE.

According to another related aspect, a method for supporting RLC layer handover between WAN supported D2D communications and direct D2D communications is provided. The method can include receiving, by a first eNB, a WAN handover request from a first UE. In one aspect, the WAN handover request may include a peer identifier and a cell identifier associated with a second UE. In one aspect, the first UE and second UE may be engaged in D2D communications. Further, the method can include transmitting the WAN handover request to a second eNB associated with the second UE. Further, the method can include receiving a RLC sequence number indicating a last successful reception by the second UE. Moreover, the method can include transmitting the RLC parameter to the first UE.

Another aspect relates to a wireless communications apparatus. The wireless communications apparatus can include means for receiving, by a first eNB, a WAN handover request from a first UE. In one aspect, the WAN handover request may include a peer identifier and a cell identifier associated with a second UE. In one aspect, the first UE and second UE may be engaged in D2D communications. Further, the wireless communications apparatus can include means for transmitting the WAN handover request to a second eNB associated with the second UE. Further, the wireless communications apparatus can include means for receiving a RLC sequence number indicating a last successful reception by the second UE. Moreover, the wireless communications apparatus can include means for transmitting the RLC parameter to the first UE.

Another aspect relates to a wireless communications apparatus. The apparatus can include a processing system configured to receive, by a first eNB, a WAN handover request from a first UE. In one aspect, the WAN handover request may include a peer identifier and a cell identifier associated with a second UE. In one aspect, the first UE and second UE may be engaged in D2D communications. Further, the processing system configured to transmit the WAN handover request to a second eNB associated with the second UE. Further, the processing system configured to receive a RLC sequence number indicating a last successful reception by the second UE. Moreover, the processing system may be configured to transmit the RLC parameter to the first UE.

Another aspect relates to a computer program product, which can have a computer-readable medium comprising code for receiving, by a first eNB, a WAN handover request from a first UE. In one aspect, the WAN handover request may include a peer identifier and a cell identifier associated with a second UE. In one aspect, the first UE and second UE may be engaged in D2D communications. Further, the computer-readable medium can include code for transmitting the WAN handover request to a second eNB associated with the second UE. Further, the computer-readable medium can include code for receiving a RLC sequence number indicating a last successful reception by the second UE. Moreover, the computer-readable medium can include code for transmitting the RLC parameter to the first UE.

According to another related aspect, a method for supporting RLC layer handover between WAN supported D2D communications and direct D2D communications is provided. The method can include receiving, by a second UE, a RLC sequence number request from a second eNB as part of a WAN handover request. In one aspect, a first UE and the second UE may be engaged in D2D communications. Moreover, the method can include transmitting a RLC sequence number indicating a last successful reception from the first UE as part of the D2D communications.

Another aspect relates to a wireless communications apparatus. The wireless communications apparatus can include means for receiving, by a second UE, a RLC sequence number request from a second eNB as part of a WAN handover request. In one aspect, a first UE and the second UE may be engaged in D2D communications. Moreover, the wireless communications apparatus can include means for transmitting a RLC sequence number indicating a last successful reception from the first UE as part of the D2D communications.

Another aspect relates to a wireless communications apparatus. The apparatus can include a processing system configured to receive, by a second UE, a RLC sequence number request from a second eNB as part of a WAN handover request. In one aspect, a first UE and the second UE may be engaged in D2D communications. Moreover, the processing system may be configured to transmit a RLC sequence number indicating a last successful reception from the first UE as part of the D2D communications.

Another aspect relates to a computer program product, which can have a computer-readable medium comprising code for receiving, by a second UE, a RLC sequence number request from a second eNB as part of a WAN handover request. In one aspect, a first UE and the second UE may be engaged in D2D communications. Moreover, the computer-readable medium can include code for transmitting a RLC sequence number indicating a last successful reception from the first UE as part of the D2D communications.

According to another related aspect, a method for supporting RLC layer handover between WAN supported D2D communications and direct D2D communications is provided. The method can include receiving, by a second UE, a RLC packet from a first UE. Moreover, the method can include transmitting the RLC packet to a second eNB for communication to the first UE. In one aspect, a first eNB and the second eNB use the same RLC sequence numbering. In one aspect, the first eNB is associated with the first UE.

Another aspect relates to a wireless communications apparatus. The wireless communications apparatus can include means for receiving, by a second UE, a RLC packet from a first UE. Moreover, the wireless communications apparatus can include means for transmitting the RLC packet to a second eNB for communication to the first UE. In one aspect, a first eNB and the second eNB use the same RLC sequence numbering. In one aspect, the first eNB is associated with the first UE.

Another aspect relates to a wireless communications apparatus. The apparatus can include a processing system configured to receive, by a second UE, a RLC packet from a first UE. Moreover, the processing system may be configured to transmit the RLC packet to a second eNB for communication to the first UE. In one aspect, a first eNB and the second eNB use the same RLC sequence numbering. In one aspect, the first eNB is associated with the first UE.

Another aspect relates to a computer program product, which can have a computer-readable medium comprising code for receiving, by a second UE, a RLC packet from a first UE. Moreover, the computer-readable medium can include code for transmitting the RLC packet to a second eNB for communication to the first UE. In one aspect, a first eNB and the second eNB use the same RLC sequence numbering. In one aspect, the first eNB is associated with the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
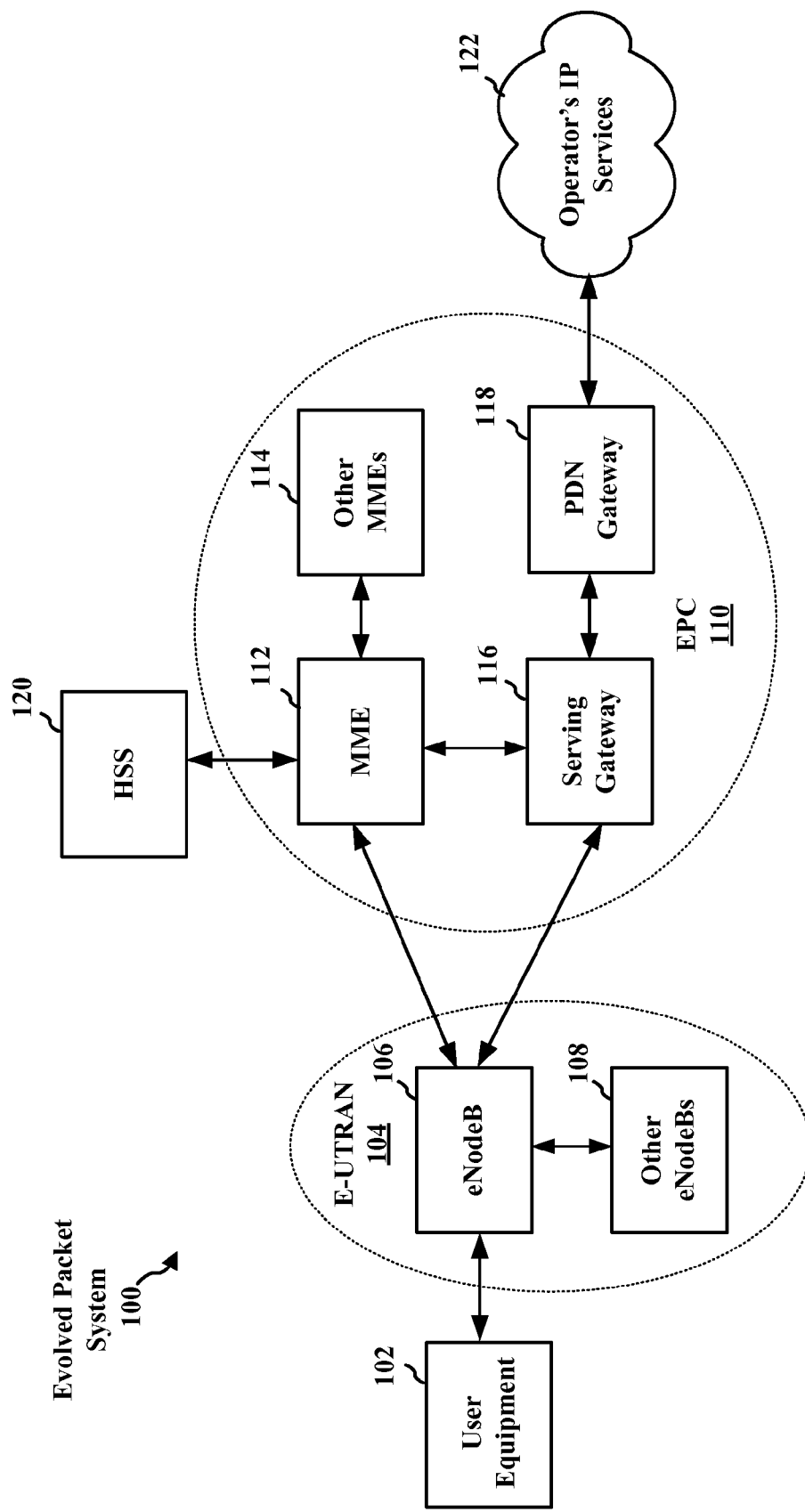
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
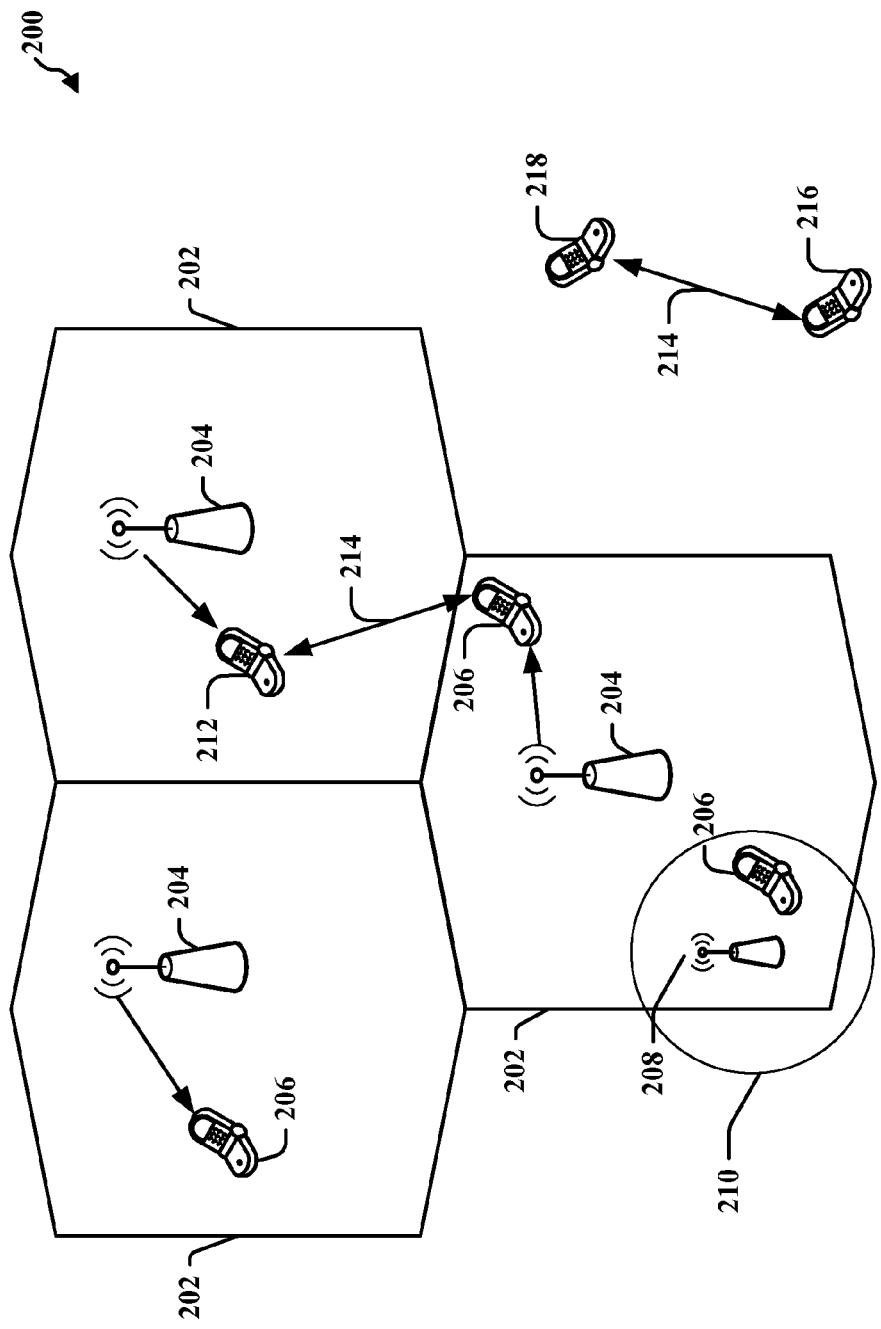
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

Further, some of the wireless devices 206, 212, 216, 218 may communicate together in peer-to-peer communication 214, some may communicate with the base station 204, and some may do both. For example, as shown in FIG. 2, the wireless devices 216, 218 may be in peer-to-peer communication 214 and the wireless devices 206, 212 may be in peer-to-peer communication 214. The wireless devices 206, 212 may also be in communication with the base station 204.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
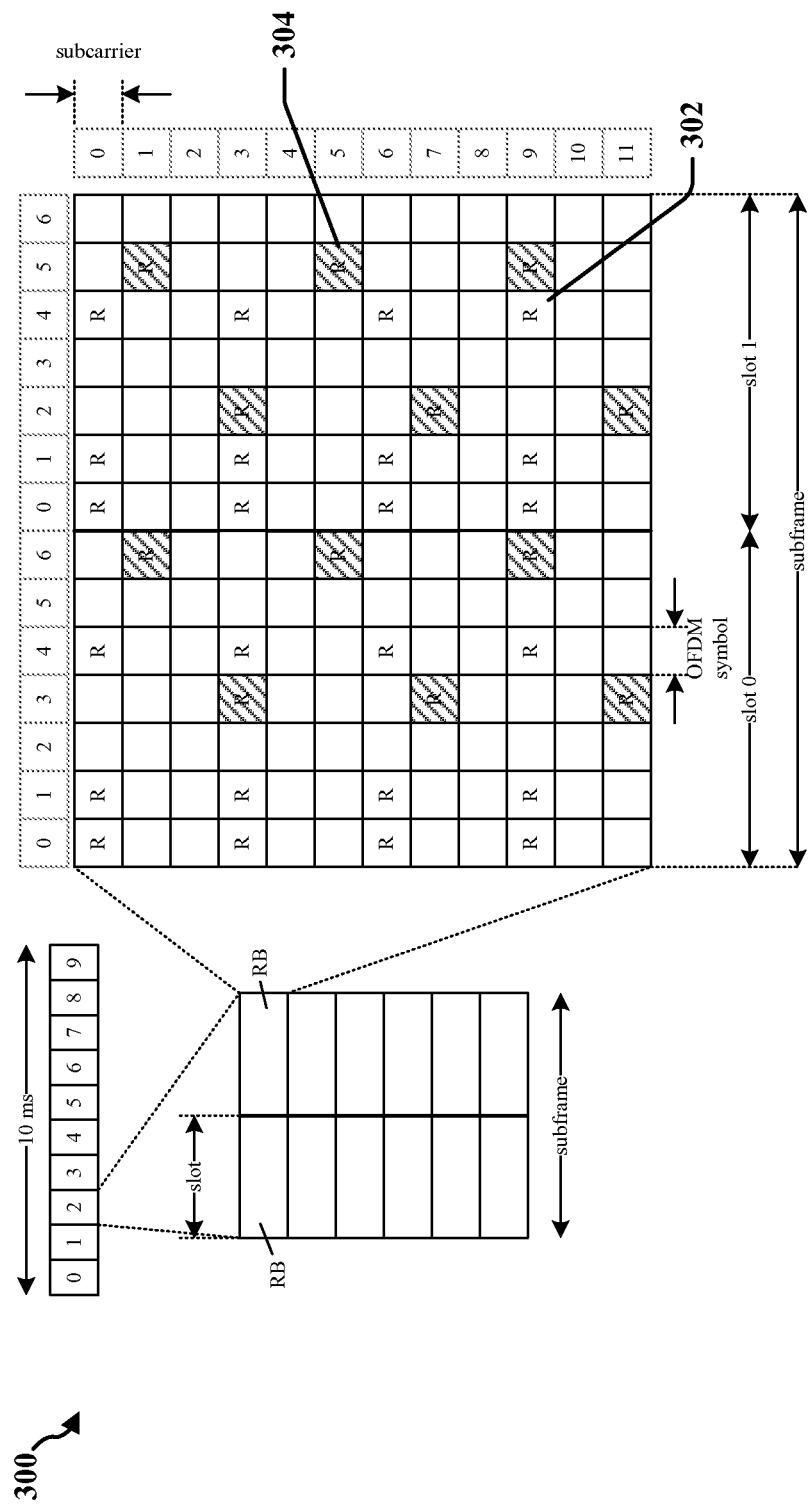
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
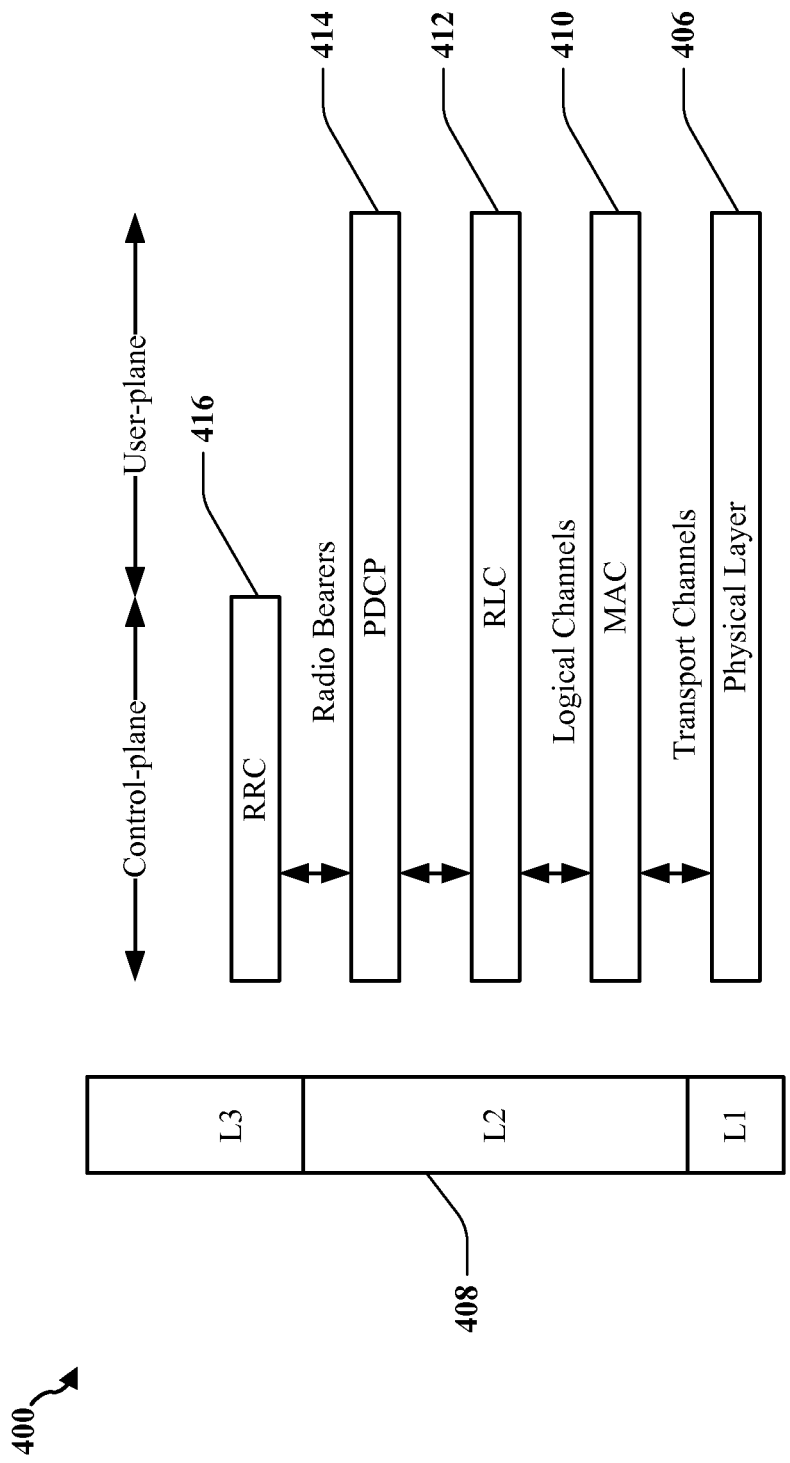
FIG. 4 is a diagram illustrating an example of a radio protocol architecture for the user and control planes.

FIG. 4 is a diagram 400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at the PDN gateway 118 on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (i.e., radio bearers) and for configuring the lower layers using RRC signaling between the eNB and the UE.

Figure 5:
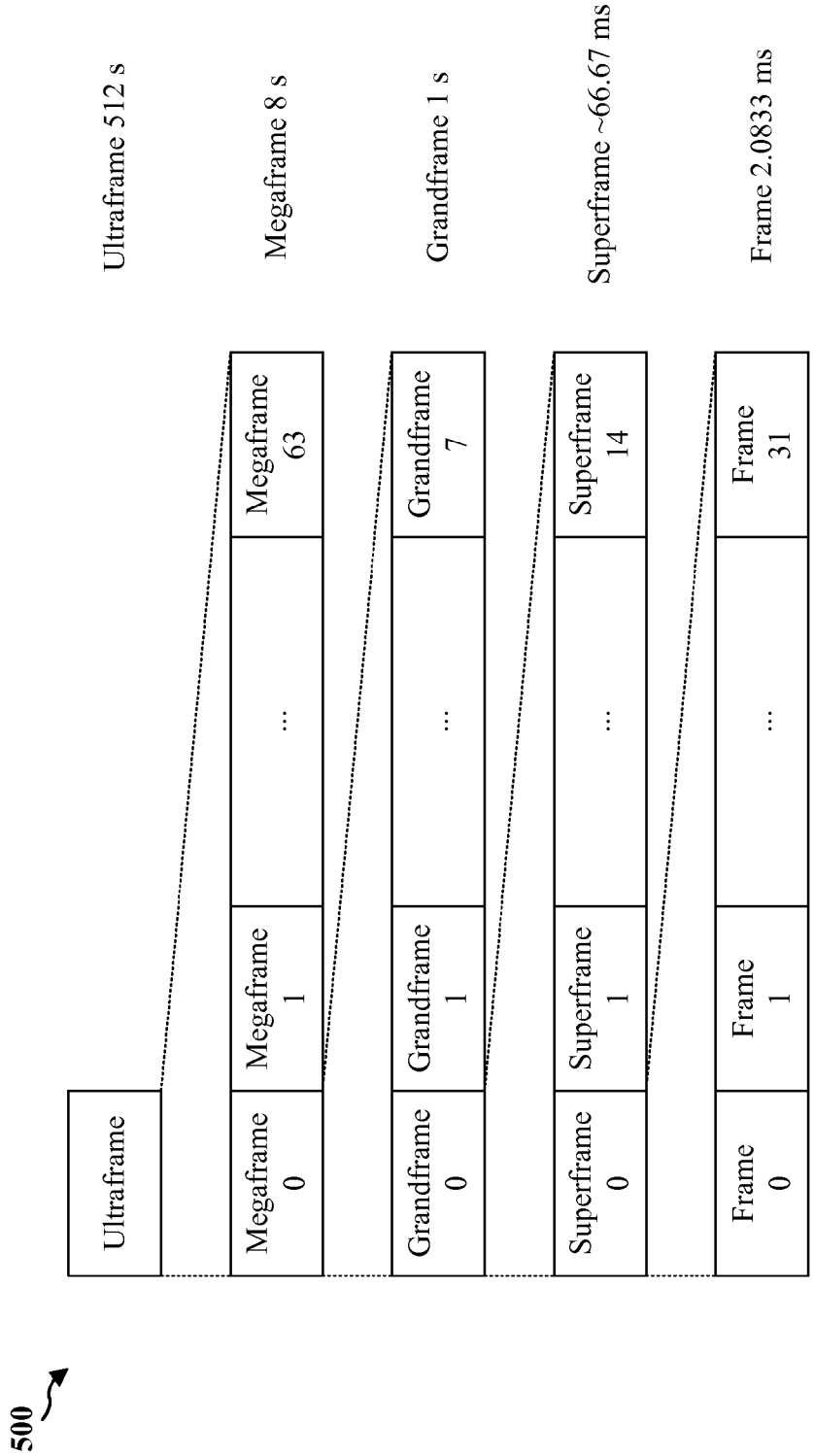
FIG. 5 is a diagram illustrating an exemplary time structure for peer-to-peer communication between the wireless devices.

FIG. 5 is a diagram 500 illustrating an exemplary time structure for peer-to-peer communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

Figure 6:
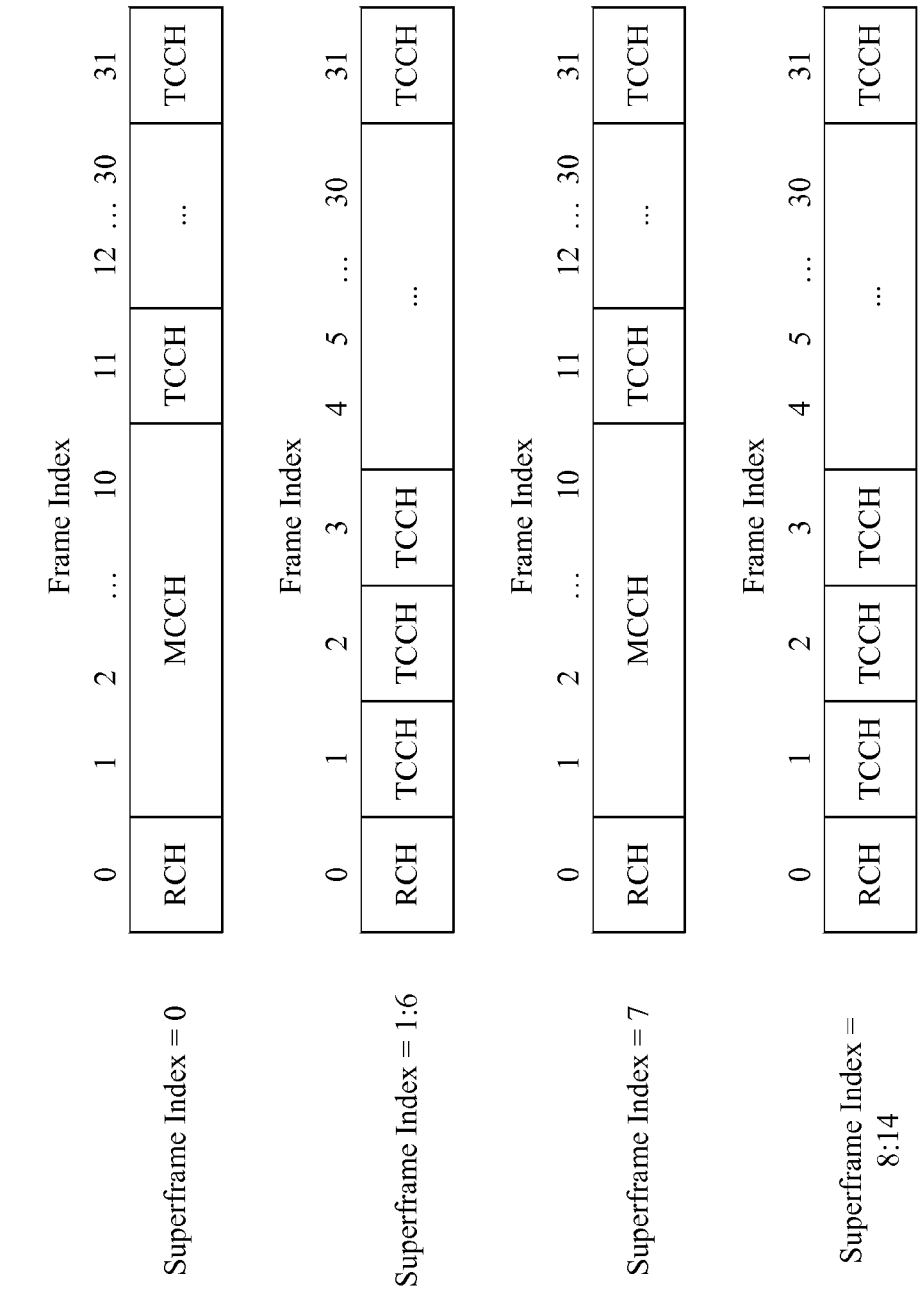
FIG. 6 is a diagram illustrating the channels in each frame of superframes in one grandframe.

FIG. 6 is a diagram 600 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the 2nd through 7th superframes (with index 1:6), frame 0 is a RCH and frames 1-31 are each a TCCH. In an 8th superframe (with index 7), frame 0 is a RCH, frames 1-10 are each a MCCH, and frames 11-31 are each a TCCH. In the 9th through 15th superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 7:
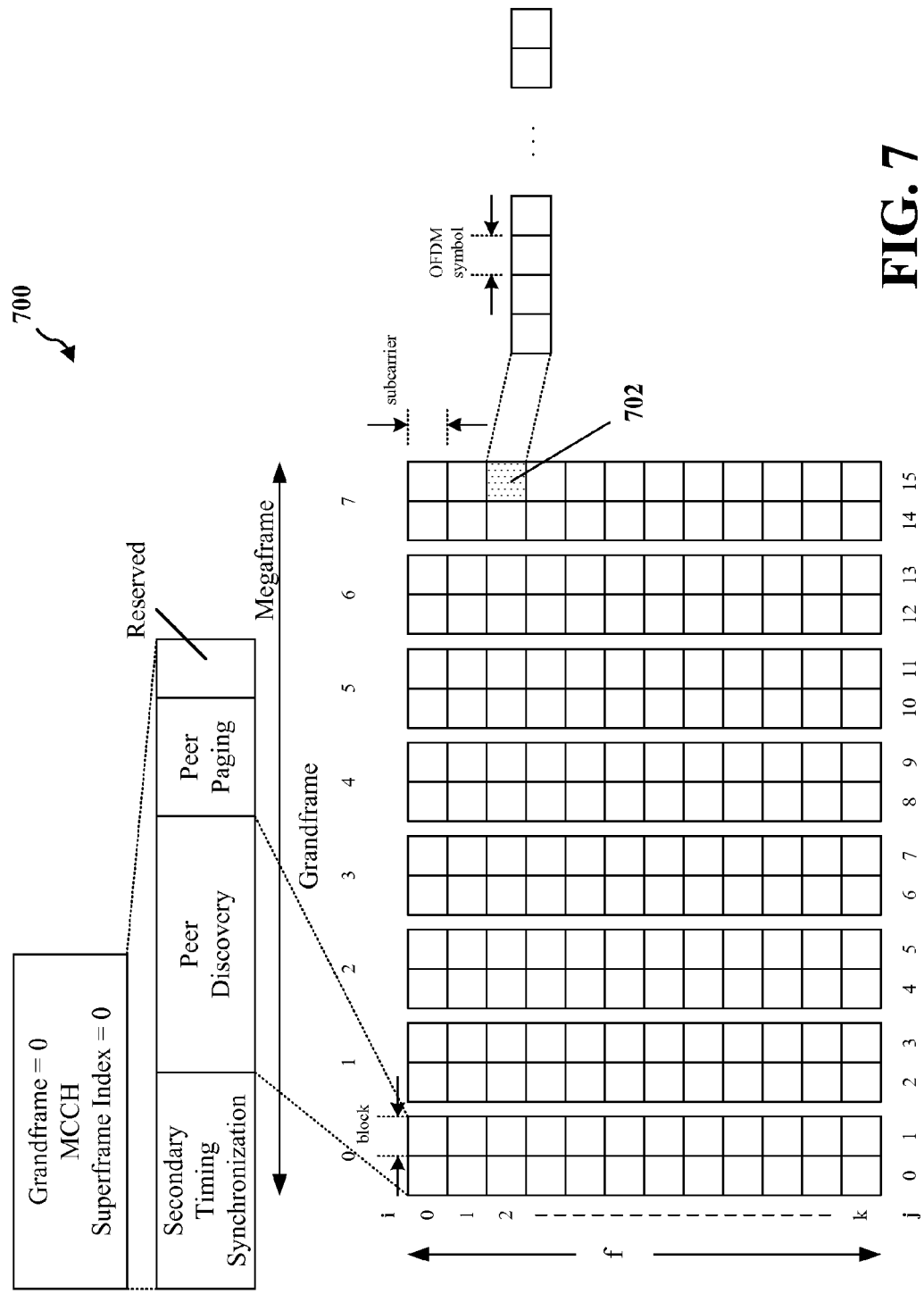
FIG. 7 is a diagram illustrating an operation timeline of a miscellaneous channel and a structure of a peer discovery channel.

FIG. 7 is a diagram 700 illustrating an operation timeline of the MCCH and an exemplary structure of a peer discovery channel. As discussed in relation to FIG. 6, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 7 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 702 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 8:
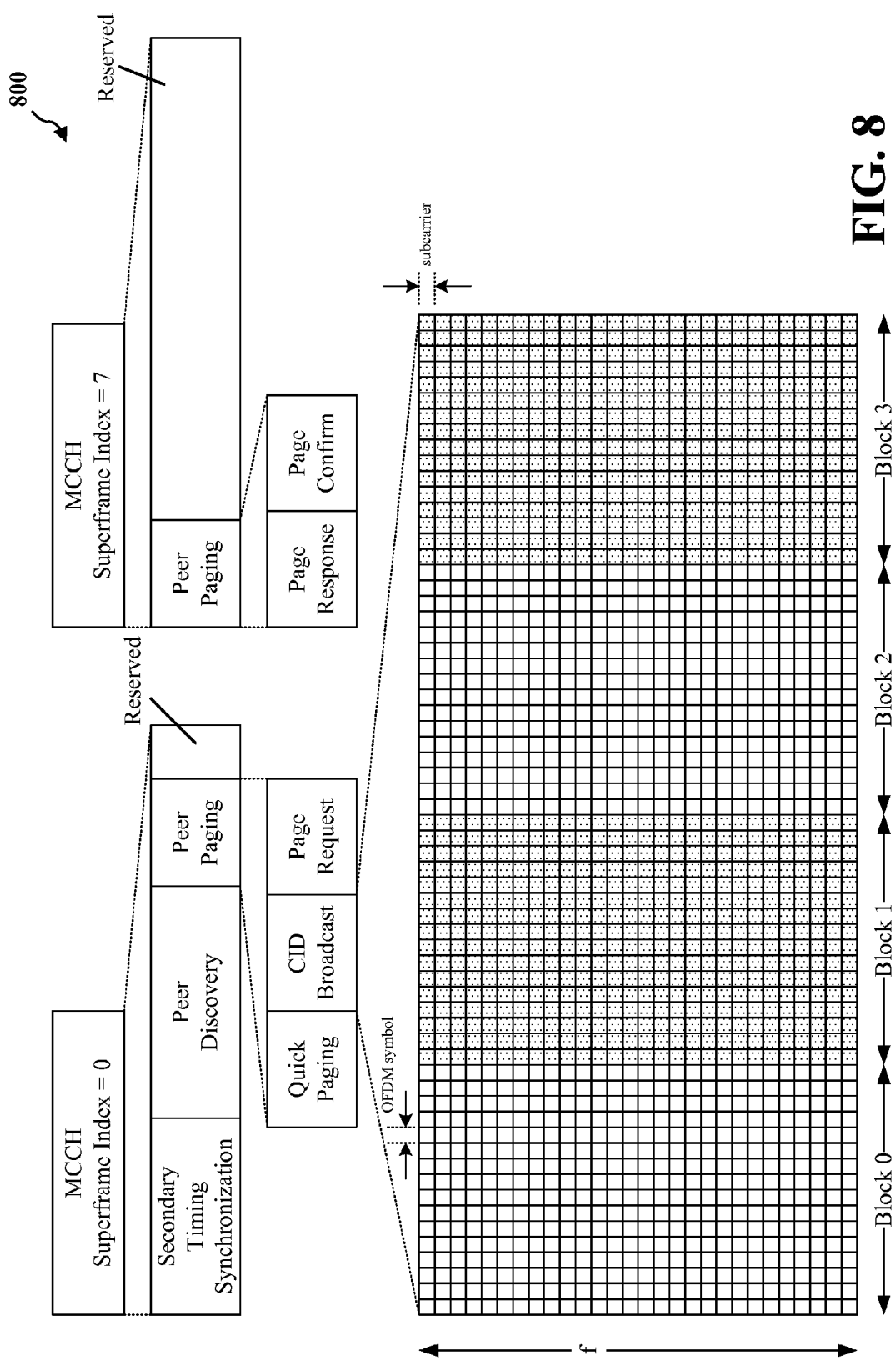
FIG. 8 is a diagram illustrating an operation timeline of a miscellaneous channel and a structure of a connection identifier broadcast.

FIG. 8 is a diagram 800 illustrating an operation timeline of the MCCH and a structure of a connection identifier (CID) broadcast. As discussed in relation to FIG. 6, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 9:
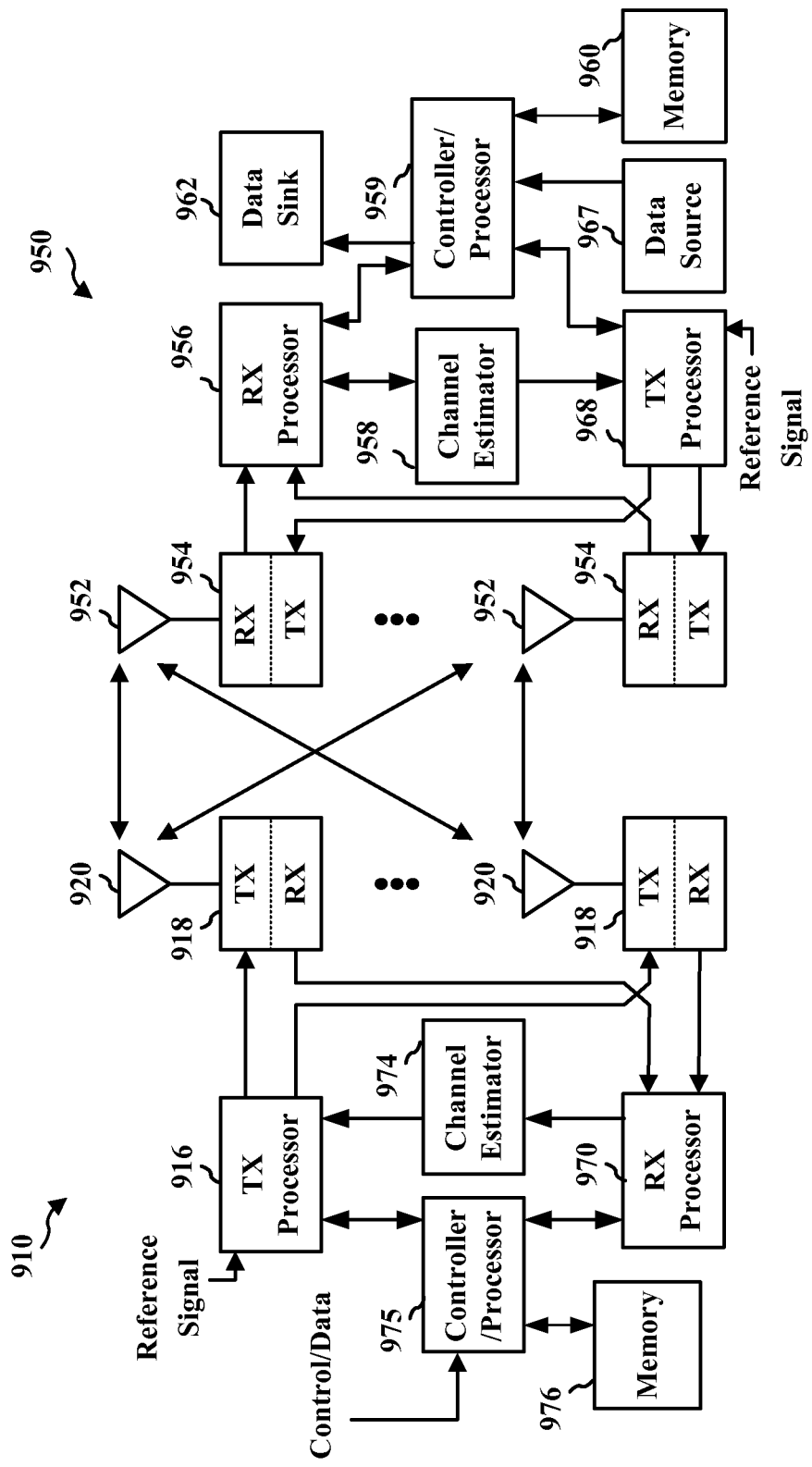
FIG. 9 is a diagram illustrating an example of an evolved Node B and user equipment in an access network.

FIG. 9 is a block diagram of an eNB 910 in communication with a UE 950 in an access network. In the DL, upper layer packets from the core network are provided to a controller/processor 975. The controller/processor 975 implements the functionality of the L2 layer. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer. The controller/processor can be associated with a memory 960 that stores program codes and data. The memory 960 may be referred to as a computer-readable medium. In the UL, the control/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations.

In the UL, a data source 967 is used to provide upper layer packets to the controller/processor 959. The data source 967 represents all protocol layers above the L2 layer. Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 may implement the L1 layer.

The controller/processor 975 implements the L2 layer. The controller/processor 975 can be associated with a memory 976 that stores program codes and data. The memory 976 may be referred to as a computer-readable medium. In the UL, the control/processor 975 provides demultiplexing between transport and logical channels, packet reassembly, deciphering, header decompression, control signal processing to recover upper layer packets from the UE 950. Upper layer packets from the controller/processor 975 may be provided to the core network. The controller/processor 975 is also responsible for error detection using an ACK and/or NACK protocol to support HARQ operations.

Figure 10:
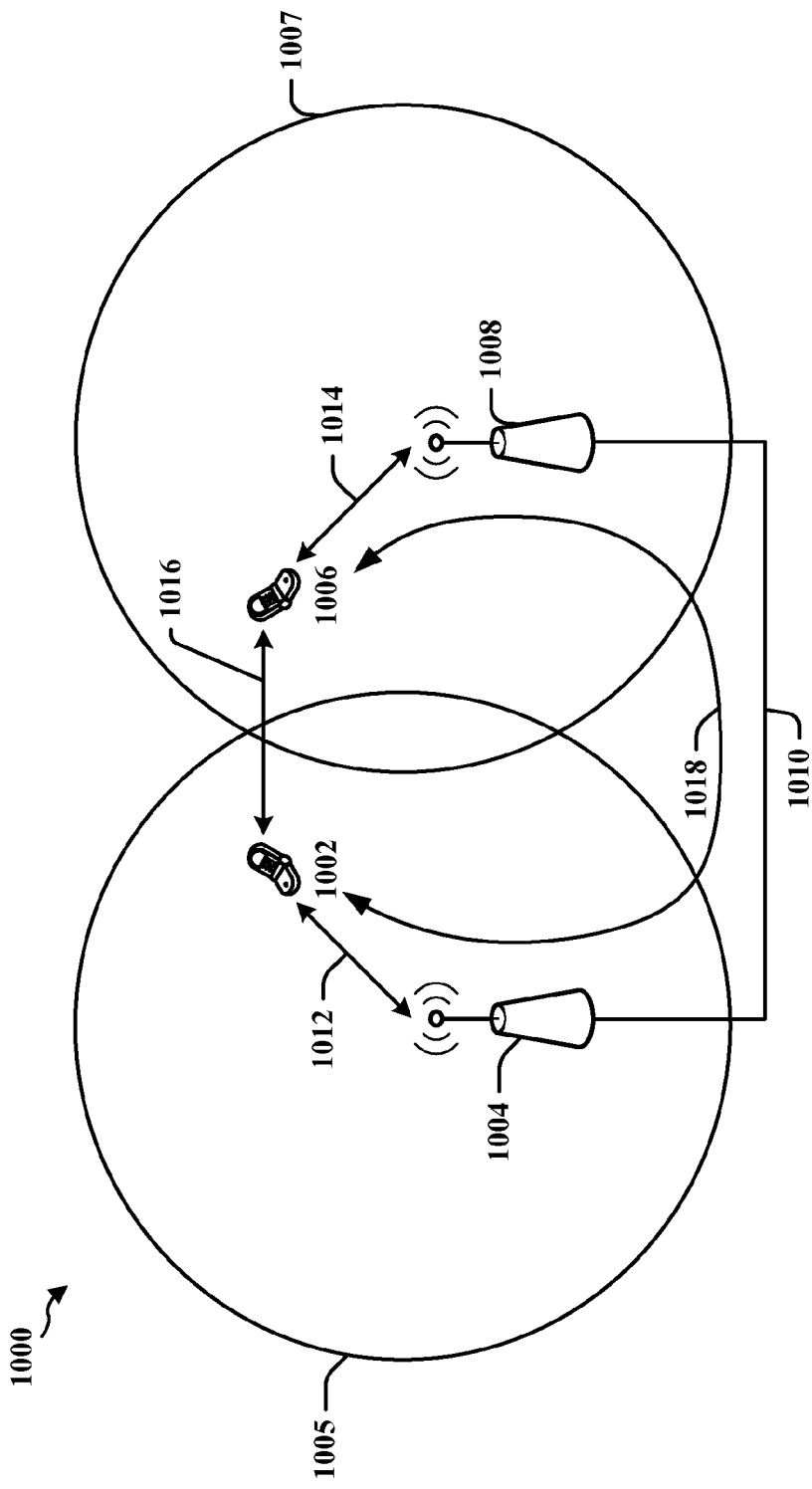
FIG. 10 is a diagram illustrating an example of an access network in which D2D communications may be performed according to an aspect.

FIG. 10 is a diagram 1000 illustrating a wireless communications environment operable to support cellular communications and peer to peer communications.

A wireless communications network 1000 may include a plurality UEs (1002, 1006), and a plurality of eNBs (1004, 1008). The UEs (1002, 1006) may be associated with difference eNBs (1004, 1008) and the eNBs (1004, 1008) may be associated with different cells (1005, 1007). In the depicted aspect, UE(1) 1002 is associated 1012 with eNB(1) 1004 in a first cell 1005 and UE(2) 1006 is associated 1014 with eNB(2) 1008 in a second cell 1007. As such, system 1000 allows for signaling 1012 between UE(1) 1002 and eNB(1) 1004, and signaling 1014 between UE(2) 1006 and eNB(2) 1008. Further, eNB(1) 1004 and eNB(2) may be part of a WAN and may communicate over a wireline connection (e.g., an X2 interface) 1010. In one aspect, UEs (1002, 1006) may be operable to communicate directly 1016 with each other using resources allocated for D2D communications. In another aspect, D2D communications 1018 may be facilitated via a WAN (e.g., eNB(1), eNB(2), etc.). Due to a variety of reasons, UE(1) 1002 may decide to handover direct D2D communications 1016 with UE(2) 1006 to D2D communications 1018 supported by the WAN through eNB(1) 1004 and eNB (2) 1008. In another aspect, UE(1) 1002 may decide to handover D2D communications 1018 supported by the WAN to direct D2D communications 1016.

In one operational aspect, a decision may be made to handover direct D2D communications to WAN supported D2D communications. In one aspect, the decision to initiate a handover may be made by one or more entities within the communications network 1000. For example, at least one of UE(1) 1002, UE(2) 1006, eNB(1) 1004, eNB(2) 1008, etc., alone or in combination, may decide the handover is to be performed. In such an aspect, UE(1) 1002 may transmit an WAN handover request message to eNB(1) 1004. The WAN handover request may include a peer identifier and a cell identifier associated with a UE(2) 1006. The eNB(1) 1004 may transmit the WAN handover request to eNB(2) 1008 associated with the second UE. In an aspect in which both UEs are supported by the same eNB, there may be no communication of the WAN handover request between an eNB(1) 1004 and an eNB(2) 1008. The eNB(2) 1008 may then transmit the WAN handover request to the indicated UE(2) 1006. UE(2) 1006 may transmit a RLC parameter to eNB(2) 1008 in response to the WAN handover request. In one aspect, the RLC parameter may indicate a RLC sequence number associated with a last successfully received content item. In another aspect, the RLC parameter may indicate a RLC acknowledgment associated with a last successfully received content item. Thereafter, eNB(2) may transmit the RLC parameter to eNB(1). The eNB(1) 1004 may then transmit the RLC parameter to UE(1) to provide UE(1) information associated with the last successfully received content item. As such, UE(1) 1002 may transmit a subsequent content item to UE(2) 1006 through the WAN (e.g., eNB(1) 1004, eNB(2) 1008) and continue D2D communications (albeit as WAN supported D2D communications instead of direct D2D communications). In one aspect, where the handover is complete, where the RLC parameter is a RLC sequence number, and where the link between UE(2) and eNB(2) used a different RLC sequence numbering scheme than the link between UE(1) and eNB(1), then eNB(1) may map the received RLC sequence number to a RLC sequence number used between UE(1) and eNB(1).

In another operational aspect, UE(1) 1002 decide to handover WAN supported D2D communications to direct D2D communications. In such an aspect, UE(1) 1002 may transmit an D2D handover request message to eNB(1) 1004. The D2D handover request may include a peer identifier and a cell identifier associated with a UE(2) 1006. The eNB(1) 1004 may transmit the D2D handover request to eNB(2) 1008 associated with the second UE. In an aspect in which both UEs are supported by the same eNB, there may be no communication of the D2D handover request between an eNB(1) 1004 and an eNB(2) 1008. The eNB(2) 1008 may then transmit the D2D handover request to the indicated UE(2) 1006. UE(2) 1006 may transmit a RLC parameter to eNB(2) 1008 in response to the D2D handover request. In one aspect, the RLC parameter may indicate a RLC sequence number associated with a last successfully received content item. In another aspect, the RLC parameter may indicate a RLC acknowledgment associated with a last successfully received content item. Thereafter, eNB(2) may transmit the RLC parameter to eNB(1). In one aspect, where the RLC parameter is a RLC sequence number, and where the link between UE(2) and eNB(2) using a different RLC sequence numbering scheme than the link between UE(1) and eNB(1), then eNB(1) may map the received RLC sequence number to a RLC sequence number used between UE(1) and eNB(1). The eNB(1) 1004 may then transmit the RLC parameter to UE(1) to provide UE(1) information associated with the last successfully received content item. Additionally, the RLC sequence number used between UE(2) and eNB(2) may be communicated to UE(1) to allow UE(1) to communicate subsequent content items directly to UE(2) using an RLC sequence number known to UE(2). As such, UE(1) 1002 may transmit a subsequent content item directly to UE(2) 1006 and continue D2D communications (albeit as direct D2D communications instead of WAN supported D2D communications).

FIGS. 11-16 and 19 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
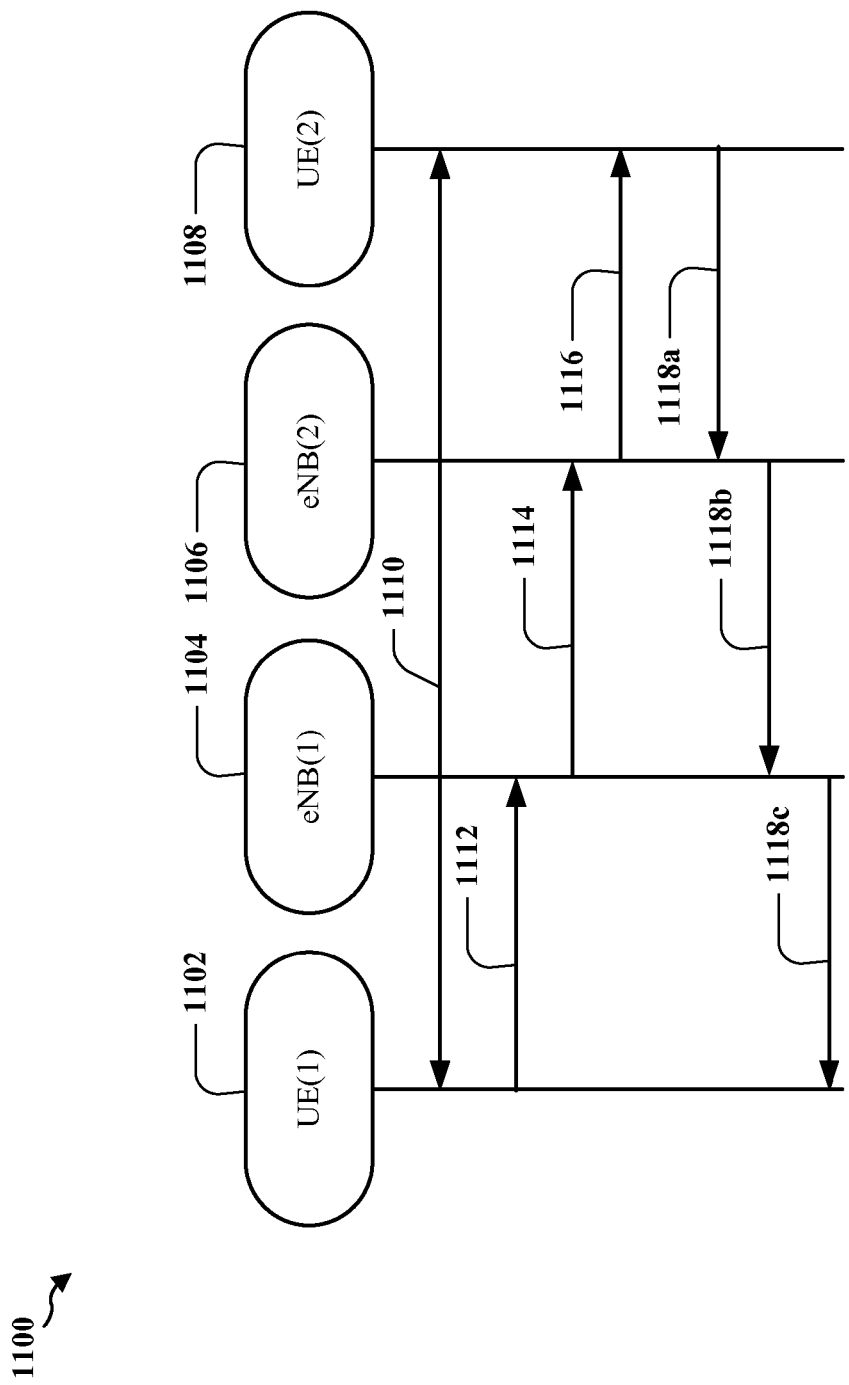
FIG. 11 is a call flow diagram for D2D communications within an access network according to an aspect.

FIG. 11 illustrates an example call flow diagram of a wireless communications system 1100 that is operable to provide handover to WAN supported D2D communications without losing the RLC layer state.

At act 1110, UEs (1102, 1108) are engaged in D2D communications in which both UEs are in a radio resource control (RRC) connected state. In such an aspect, data is communicated between the UEs with the data being segmented and indexed with a RLC sequence number.

At act 1112, UE(1) 1102 may decide to request that the communications with UE(2) 1108 be handed over to being supported by the WAN through eNB 1104 and optionally eNB 1106 and transmit a handover request to eNB(1) 1104. In one aspect, the handover request includes a peer identifier identifying UE(2) 1108 and a cell identifier identifying the cell support UE(2) 1108 (e.g., eNB(2) 1106). In one aspect, the handover request is transmitted using RRC signals.

At act 1114, eNB(1) 1104 communicates the handover request with the included peer identifier and cell identifier to the cell identified in the handover request (e.g., eNB(2) 1106). In one aspect, the handover request may be communicated between the eNBs using X2 signaling. In an aspect in which both UEs are supported by the same eNB act 1114 may be removed.

At act 1116, eNB(2) 1106 communicates the handover request to the peer (e.g., UE(2) 1108) identified by the peer identifier in the handover request. In one aspect, the handover request may be communicated using RRC signaling.

At acts 1118a, 1118b, and 1118c, eNB(2) 1108 may transmit the requested parameter back to UE(1) through eNB(2) at act 1118a, eNB(1) at act 1118b, and finally to UE(1) at act 1118c. In one aspect, eNB(2) 1106 may maintain an additional state in order to map the sequence number used on eNB(2)-UE(2) link to the sequence number used on eNB(1)-UE(1) link.

Figure 12:
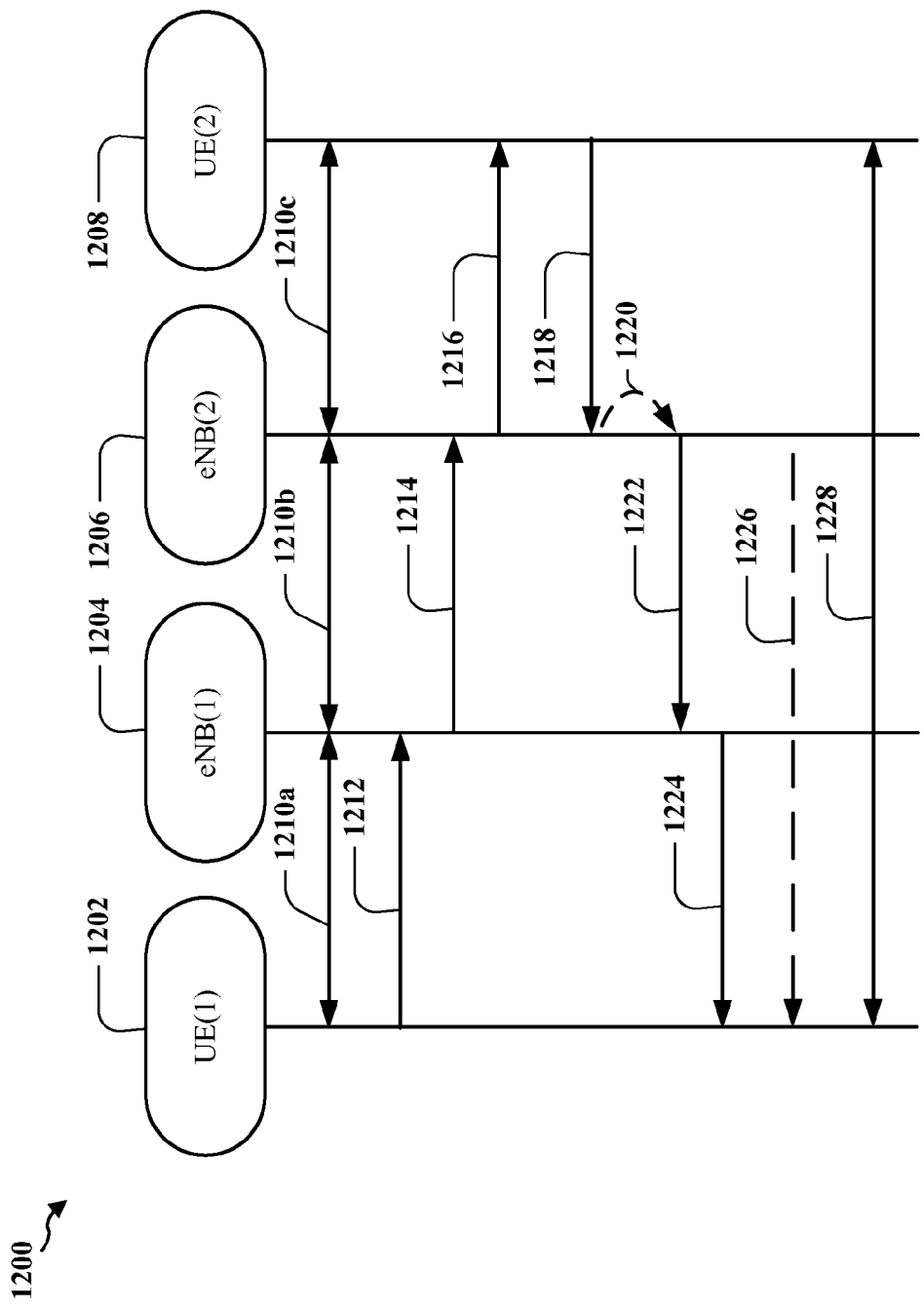
FIG. 12 is another call flow diagram for D2D communications within an access network according to an aspect.

FIG. 12 illustrates an example call flow diagram of a wireless communications system 1200 that is operable to provide handover from WAN supported D2D communications to direct D2D communications without losing the RLC layer state.

At act 1210a, 1210b, and 1210c, UEs (1202, 1208) are engaged in WAN supported D2D communications in which both UEs are in a RRC connected state. During WAN supported D2D communications, content is communicated between UE(1) 1202 and eNB(1) 1204 at act 1210a, between eNB(1) 1204 and eNB(2) at act 1210b, and between UE(2) and eNB(2) at act 1210c. In such an aspect, data is communicated between the UEs through a WAN with the data being segmented and indexed with one or more RLC sequence numbers. In one aspect, the WAN may include one or more eNBs (e.g., eNB(1) 1204, eNB(2) 1206). In one aspect, a first set of RLC sequence numbers may be used to communicate between UE(1) 1202 and eNB(1) 1204 a second set of RLC sequence numbers may be used to communicate between eNB(2) 1206 and UE(2) 1208.

At act 1212, UE(1) 1202 may decide to switch from WAN supported D2D communications to direct D2D communications between UE(1) and UE(2) and may transmit a handoff request to eNB(1) 1204.

At act 1214, eNB(1) 1204 may communicate the handover request to eNB(2) 1206. At act 1216, eNB(2) 1206 transmits a message to UE(2) 1208 to request a latest RLC parameter (e.g., a RLC layer sequence number, a RLC acknowledgement) successfully received. At act 1218, UE(2) 1208 transmits the latest RLC parameter to eNB(2) 1206. In one optional aspect where the RLC parameter includes a RLC sequence number, at act 1220, eNB(2) 1206 may map the response RLC sequence number used on the eNB(2) 1206 to UE(2) 1208 link to the RLC sequence number used on the UE(1) 1202 to eNB(1) 1204 link. At act 1222, the RLC parameter is transmitted from eNB(2) 1206 to eNB(1) 1204. At act 1224, the RLC parameter is then transmit by eNB(1) 1204 to UE(1) 1202. Additionally, at act 1226, in an optional aspect where the RLC parameter is a RLC sequence number, the sequence number used on the eNB(2) 1206 to UE(2) 1208 link may also be sent to UE(1) 1202 so that when D2D transmissions on the UE(1) 1202 to UE(2) 1208 link start, UE(1) 1202 can use the next RLC sequence number, as known by UE(2) 1208. At act 1228, UE(1) 1202 may communicate directly with UE(2) based on the RLC parameter information. As such, a handover from WAN supported D2D communications to direct D2D communications may be RLC transparent to the UE(2) 1208. FIG. 11 illustrates an example call flow diagram of a wireless communications system 1100 that is operable to enable a UE to determine available resources for D2D Communication between a pair of devices.

Figure 13:
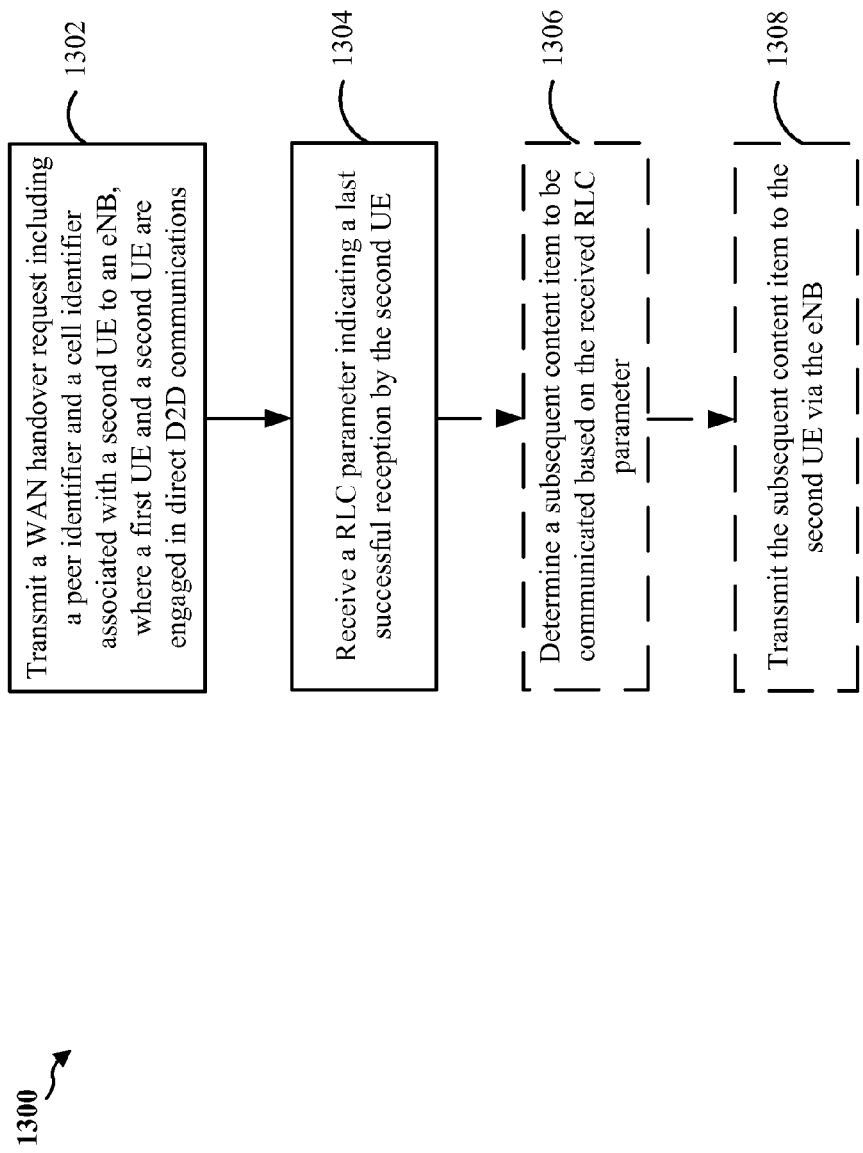
FIG. 13 is a flow chart of a method of wireless communication.

FIG. 13 is a flow chart 1300 of a method of wireless communication. The method may be performed by a wireless device.

At block 1302, the wireless device may transmit a WAN handover request including a peer identifier and a cell identifier associated with a second UE to an eNB. In one aspect, the wireless device and a second UE are engaged in direct D2D communications. In one aspect, the eNB may include a first eNB associated with the first UE and a second eNB associated with the second UE. In one aspect, WAN handover request may be transmitted using RRC signaling.

At block 1304, the wireless device may receive a RLC parameter indicating a last successful reception by the second UE. In one aspect, the RLC parameter may include a RLC sequence number corresponding to a last successfully received content item by the second UE. In such an aspect, the RLC sequence number may be communicated via the eNB. In one aspect, the RLC parameter may include a RLC acknowledgement. In such an aspect, the RLC acknowledgment may be communicated using the direct D2D communication link.

In an optional aspect, at block 1306, the wireless device may determine a subsequent content item to be communicated based on the received RLC parameter.

Further, in the optional aspect, at block 1308, the wireless device may transmit the subsequent content item to the second UE via the eNB.

Figure 14:
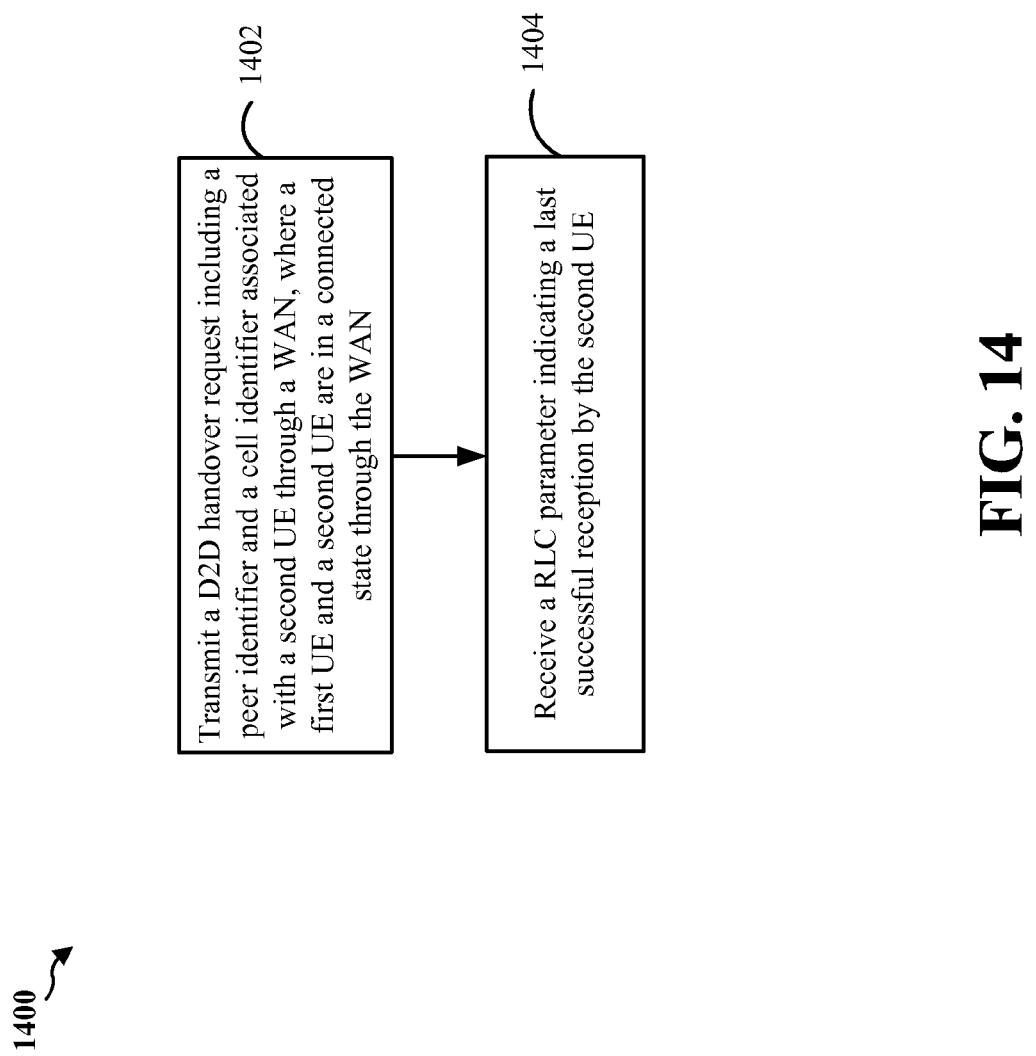
FIG. 14 is a flow chart of another method of wireless communication.

FIG. 14 is a flow chart 1400 of a method of wireless communication. The method may be performed by a wireless device.

At block 1402, a wireless device may transmit a D2D handover request including a peer identifier and a cell identifier associated with a second UE through a WAN. In one aspect, wireless device and a second UE are engaged in D2D communications in a connected state through the WAN. In one aspect, D2D handover request may be transmitted using RRC signaling.

At block 1404, the wireless device may receive a RLC parameter indicating a last successful reception by the second UE. In one aspect, the RLC parameter may include a RLC sequence number corresponding to a last successfully received content item by the second UE. In such an aspect, the RLC sequence number may be communicated via the eNB. In such an aspect, the eNB may communicate a mapping to covert between RLC sequences numbers used between the wireless device and a first eNB and RLC sequences numbers used between the second UE and a second eNB. In another aspect, the RLC sequence numbering used between the wireless device and the first eNB may be the same as RLC sequence numbering used between the second UE and the second eNB. In one aspect, the RLC parameter may include a RLC acknowledgement. In such an aspect, the RLC acknowledgment may be communicated using the WAN.

Figure 15:
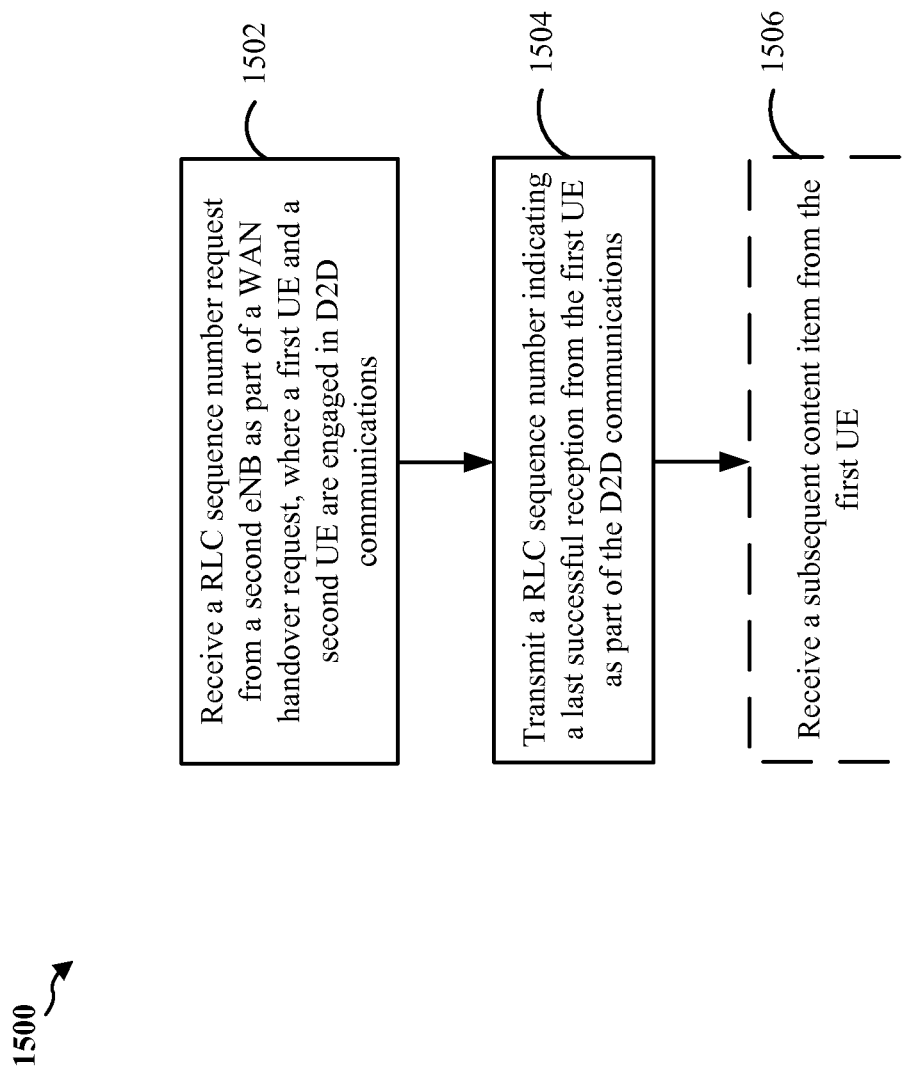
FIG. 15 is a flow chart of another method of wireless communication.

FIG. 15 is a flow chart 1500 of a method of wireless communication. The method may be performed by a wireless device.

At block 1502, a wireless device may receive a RLC sequence number request from a second eNB as part of a WAN handover request. In one aspect, a first UE and the wireless device may be engaged in direct D2D communications.

At block 1504, the wireless device may transmit a RLC sequence number indicating a last successful reception from the first UE as part of the direct D2D communications.

In an optional aspect, at block 1506, the wireless device may receive a subsequent content item based on the RLC sequence number indicating the last successfully received content item.

Figure 16:
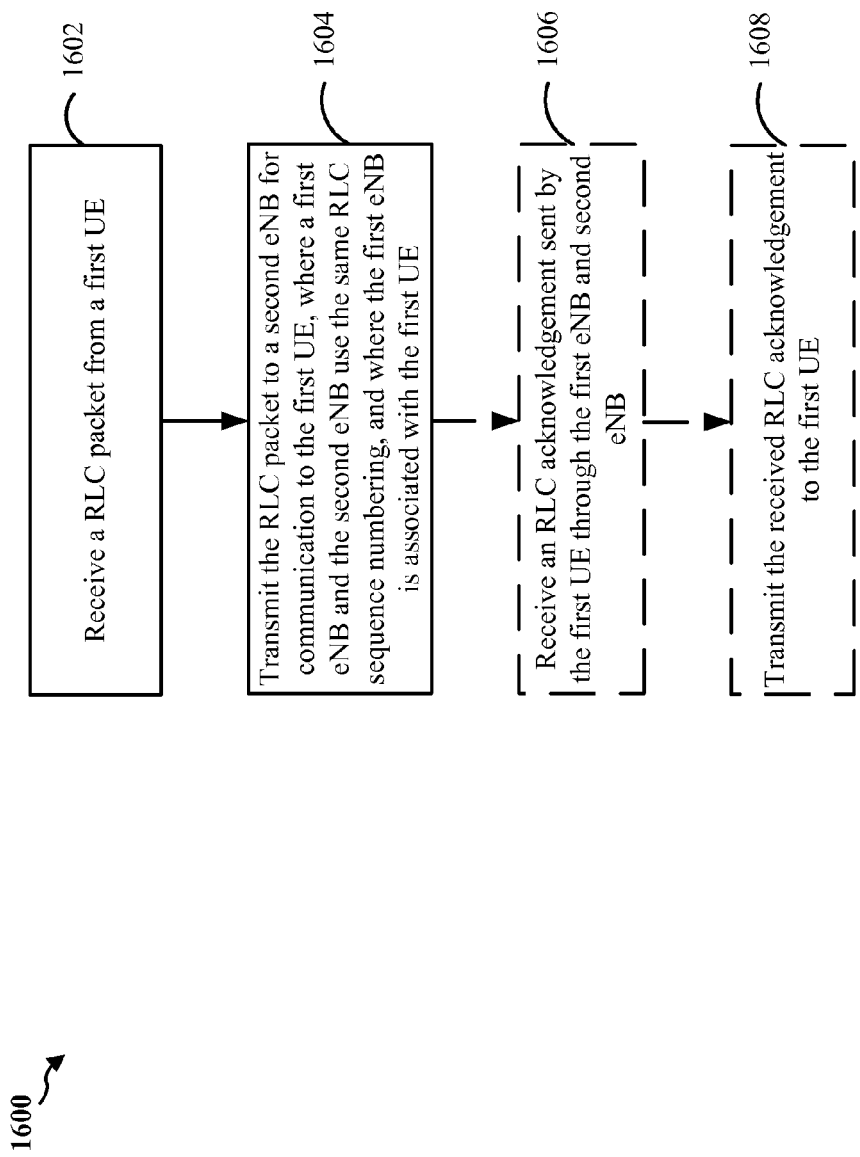
FIG. 16 is a flow chart of another method of wireless communication.

FIG. 16 is a flow chart 1600 of a method of wireless communication. The method may be performed by a wireless device.

At block 1602, a wireless device may receive a RLC packet from a first UE. In one aspect, the RLC packet may be received directly from the first UE.

At block 1604, the wireless device may transmit the RLC packet to a second eNB for communication to the first UE. In one aspect, a first eNB and the second eNB use the same RLC sequence numbering and the first eNB is associated with the first UE.

In another optional aspect, at block 1606, the wireless device may receive an RLC acknowledgement sent by the first UE through the first eNB and second eNB. At optional block 1608, the wireless device may transmit received RLC acknowledgement to the first UE. In such an aspect, the wireless device may transmit the received RLC acknowledgement directly to the first UE.

Figure 17:
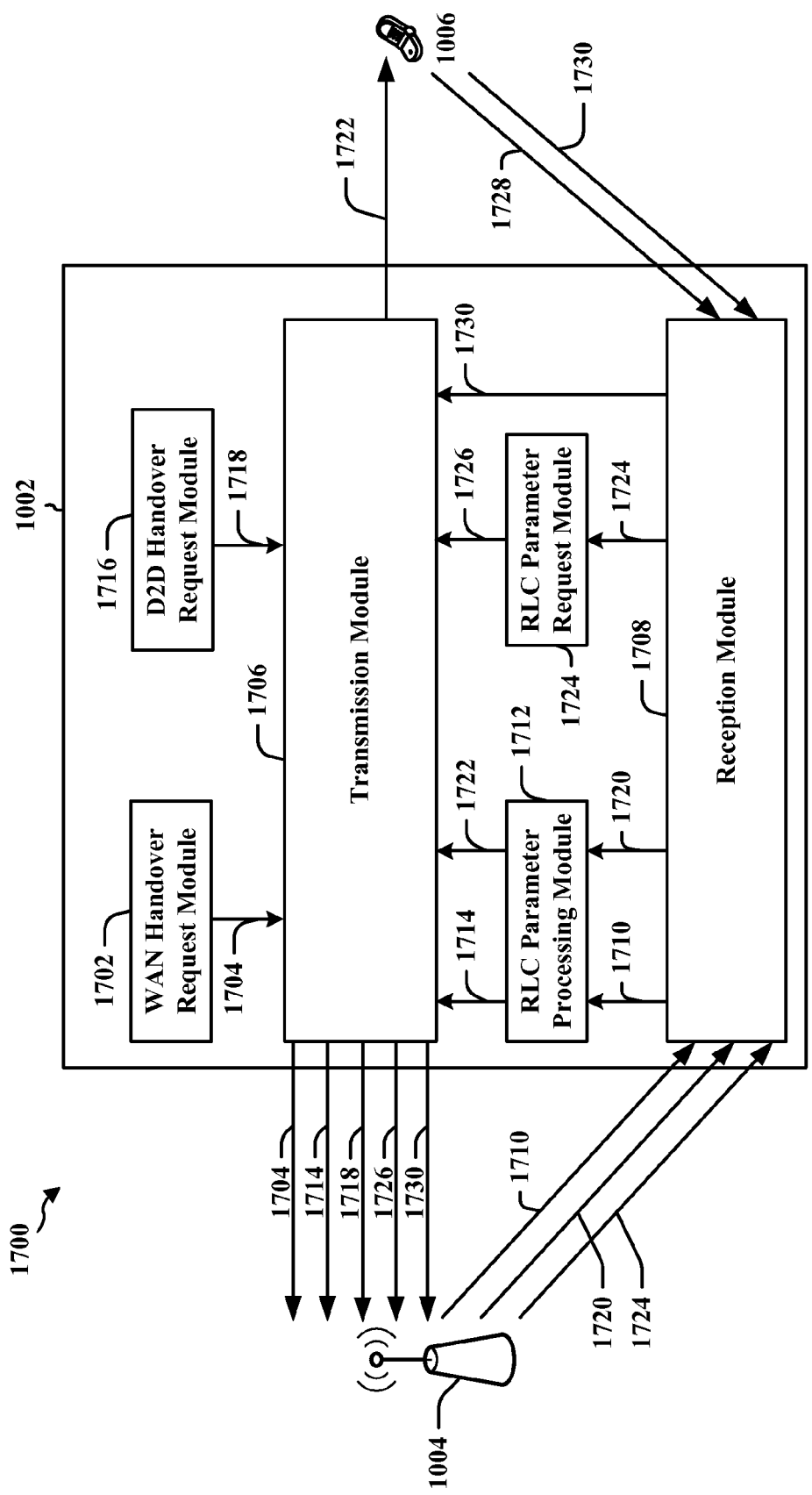
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1002. The apparatus 1002 includes a transmission module 1702 that may transmit one or more signals (1704, 1714, 1718, 1772 1728, and 1732) to a first eNB 1004 and/or a peer wireless device 1006. Apparatus 1002 includes reception module 1708 that may signaling (1710, 1720, 1724, 1730, and 1732) from a first eNB 1004 and/or a peer wireless device 1006.

Apparatus 1002 further includes WAN handover request module 1702 that may be operable to determine to handover D2D communications from direct D2D communications to WAN supported D2D communications and generate a WAN handover request 1704 for transmission to eNB 1004 by transmission module 1706. Apparatus 1002 may further include RLC parameter processing module 1712 that may process a RLC parameter 1710 received from eNB 1004 via reception module 1708. In one aspect, the RLC parameter 1710 may indicate a RLC sequence number associated with a last successfully received content item. In another aspect, the RLC parameter 1714 may indicate a RLC acknowledgment associated with a last successfully received content item. In one aspect, RLC parameter processing module 1712 may determine a subsequent content item for transmission 1714 to peer device 1006 based on the received RLC parameter 1710. Thereafter, WAN handover may be successfully completed by transmission module 1706 transmitting the subsequent content item 1714 to the wireless device 1006 via the first eNB 1004.

Apparatus 1002 may further include D2D handover request module 1716 that may be operable to determine to handover D2D communications from WAN supported D2D communications to direct D2D communications and generate a D2D handover request 1718 for transmission to eNB 1004 by transmission module 1706. As noted above, RLC parameter processing module 1712 that may process a RLC parameter 1720 received from eNB 1004 via reception module 1708. In one aspect, the RLC parameter 1720 may indicate a RLC sequence number associated with a last successfully received content item. In another aspect, the RLC parameter 1720 may indicate a RLC acknowledgment associated with a last successfully received content item. In one aspect, RLC parameter processing module 1712 may determine a subsequent content item for transmission 1722 to peer device 1006 based on the received RLC parameter 1720. Thereafter, D2D handover may be successfully completed by transmission module 1706 transmitting the subsequent content item 1722 directly to the wireless device 1006.

Apparatus 1004 may further include RLC parameter request module 1724 that may be operable to generate a RLC parameter 1726 in response to receiving a handover request 1724. In one aspect, the handover request 1724 may be a WAN handover request (e.g., 1704), or a D2D handover request (e.g., 1718). In one aspect, the RLC parameter 1726 may indicate a RLC sequence number associated with a last successfully received content item. In another aspect, the RLC parameter 1726 may indicate a RLC acknowledgment associated with a last successfully received content item. RLC parameter request module 1724 may be provided to transmission module 1706 for transmission to first eNB 1004. In such an aspect where the received handover request 1724 is a D2D handover request, then reception module 1708 may receive a subsequent content item 1728 directly from peer wireless device 1006.

In one aspect, apparatus 1004 may receive a RLC packet 1730. In such an aspect where a first eNB and the second eNB use the same RLC sequence numbering, transmission module 1706 may transmit the RLC packet 1730 to first eNB 1004.

The apparatus may include additional modules that perform each of the steps of the algorithm in the aforementioned flow charts FIGS. 13-16. As such, each step in the aforementioned flow charts FIGS. 13-16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
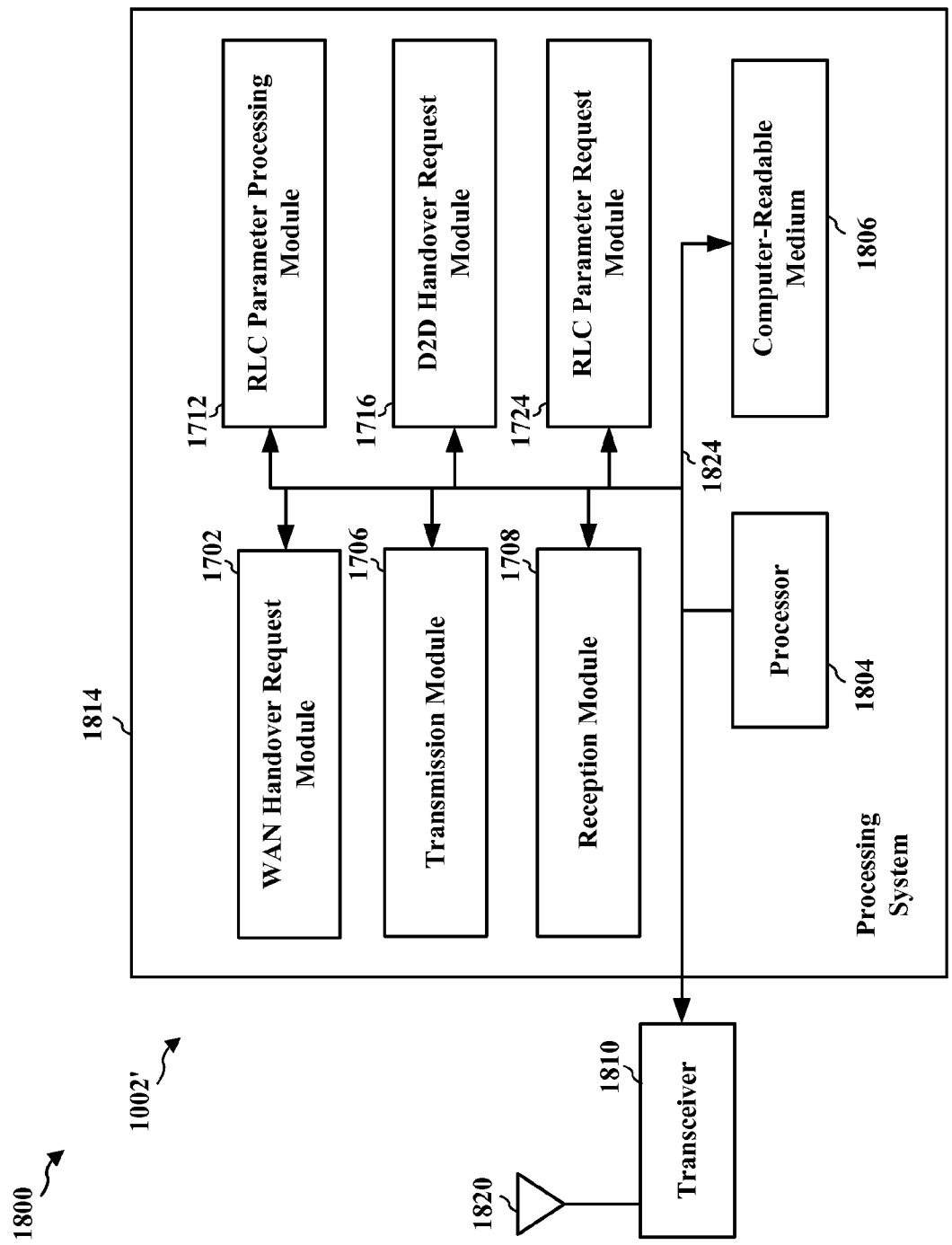
FIG. 18 is a diagram illustrating an example of a hardware implementation for an apparatus employing a processing system.

FIG. 18 is a diagram illustrating an example of a hardware implementation for an apparatus 1002' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1702, 1706, 1708, 1712, 1716, 1724, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1404, causes the processing system 1814 to perform the various functions described supra for any particular apparatus. The computer-readable medium 1806 may also be used for storing data that is manipulated by the processor 1804 when executing software. The processing system further includes at least one of the modules 1702, 1706, 1708, 1712, 1716, and 1724. The modules may be software modules running in the processor 1804, resident/stored in the computer readable medium 1806, one or more hardware modules coupled to the processor 1804, or some combination thereof.

In one configuration, the apparatus 1002/1002' for wireless communication includes means for transmitting, by a first UE, a WAN handover request to an eNB, wherein the WAN handover request includes a peer identifier and a cell identifier associated with a second UE, and wherein the first UE and the second UE are in a connected state engaged in direct D2D communications, and means for receiving a RLC parameter indicating a last successful reception by the second UE. In such an aspect, apparatus 1002/1002' for wireless communication may further include means for determining a subsequent content item to be communicated based on the received RLC parameter, and means for transmitting the subsequent content item to the second UE via the eNB. The apparatus 1002/1002' for wireless communication may include means for transmitting, by a first UE, a D2D handover request through a WAN, wherein the D2D handover request includes a peer identifier and a cell identifier associated with a second UE, and wherein the first UE and the second UE are in a connected state through the WAN, and means for receiving a RLC parameter indicating a last successful reception by the second UE. The apparatus 1002/1002' for wireless communication may include means for receiving, by a second UE, a RLC sequence number request from a second eNB as part of a handover request, and means for transmitting a RLC sequence number indicating a last successful reception from the first UE as part of D2D communications. In such an aspect, the apparatus 1002/1002' may further include either means for receiving a subsequent content item from the first UE via the second eNB, wherein the subsequent content item is determined based on the transmitted RLC sequence number, or means for receiving a subsequent content item directly from the first UE, wherein the subsequent content item is determined based on the transmitted RLC sequence number. The apparatus 1002/1002' for wireless communication may include means for receiving, by a second UE, a RLC packet from a first UE, and means for transmitting the RLC packet to a second eNB for communication to the first UE, wherein a first eNB and the second eNB use the same RLC sequence numbering, and wherein the first eNB is associated with the first UE. In such an aspect, the apparatus 1002/1002' may further include either means for receiving an RLC acknowledgement sent by the first UE through the first eNB and second eNB, and means for transmitting the received RLC acknowledgement to the first UE.

The aforementioned means may be one or more of the aforementioned modules of the apparatus 1002 and/or the processing system 1814 of the apparatus 1002' configured to perform the functions recited by the aforementioned means.

Figure 19:
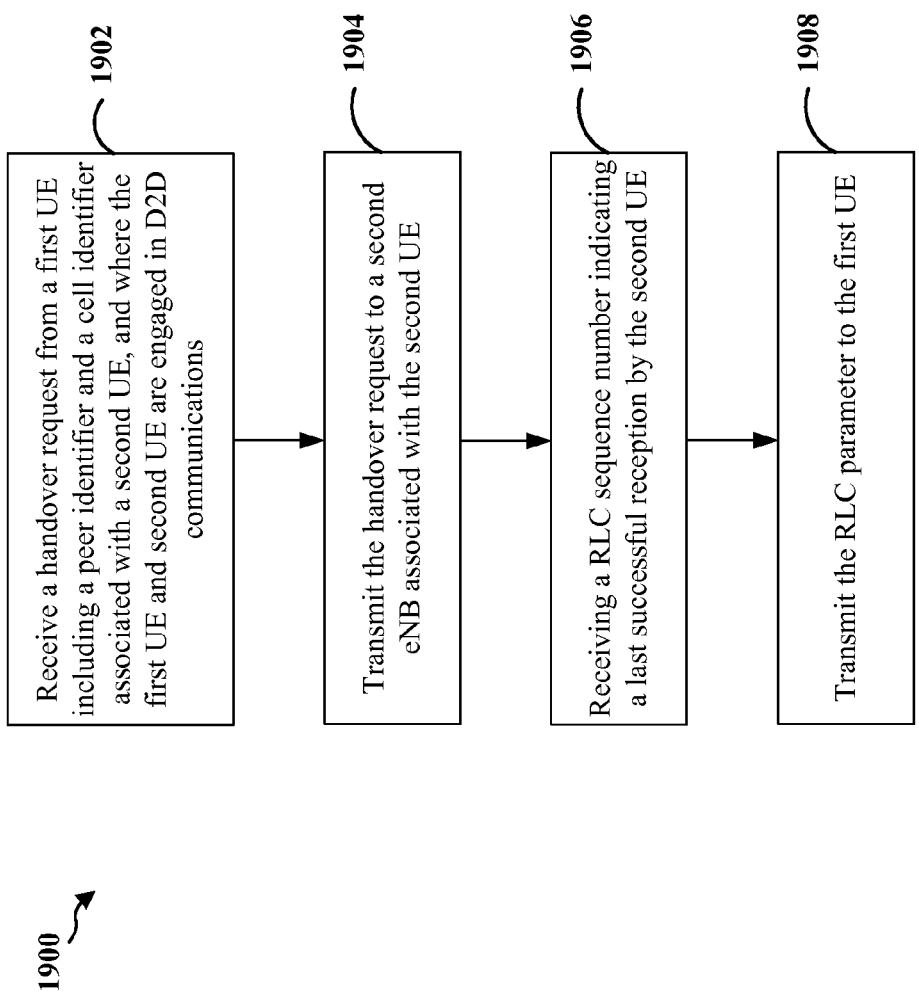
FIG. 19 is a flow chart of a method of wireless communication.

FIG. 19 is a flow chart 1900 of a method of wireless communication. The method may be performed by an evolved Node-B (eNB).

At block 1902, the eNB may receive a handover request from a first UE. In one aspect, the handover request may include a peer identifier and a cell identifier associated with a second UE. In such an aspect, the first UE and second UE may be engaged in direct D2D communications.

At block 1904, the eNB transmit the handover request to a second eNB associated with the second UE. In one aspect, the first eNB and second eNB may communicate over an X2 interface.

At block 1906, the eNB may receive a RLC sequence number indicating a last successful reception by the second UE. In one aspect, RLC sequence numbering used between the first UE and the first eNB is the same as RLC sequence numbering used between the second UE and the second eNB. In such an aspect, the reception may further include mapping from RLC sequences numbers used between the second UE and the second eNB to RLC sequences numbers used between the first UE and the first eNB.

At block 1908, the eNB may transmit the RLC sequence number to the first UE.

Figure 20:
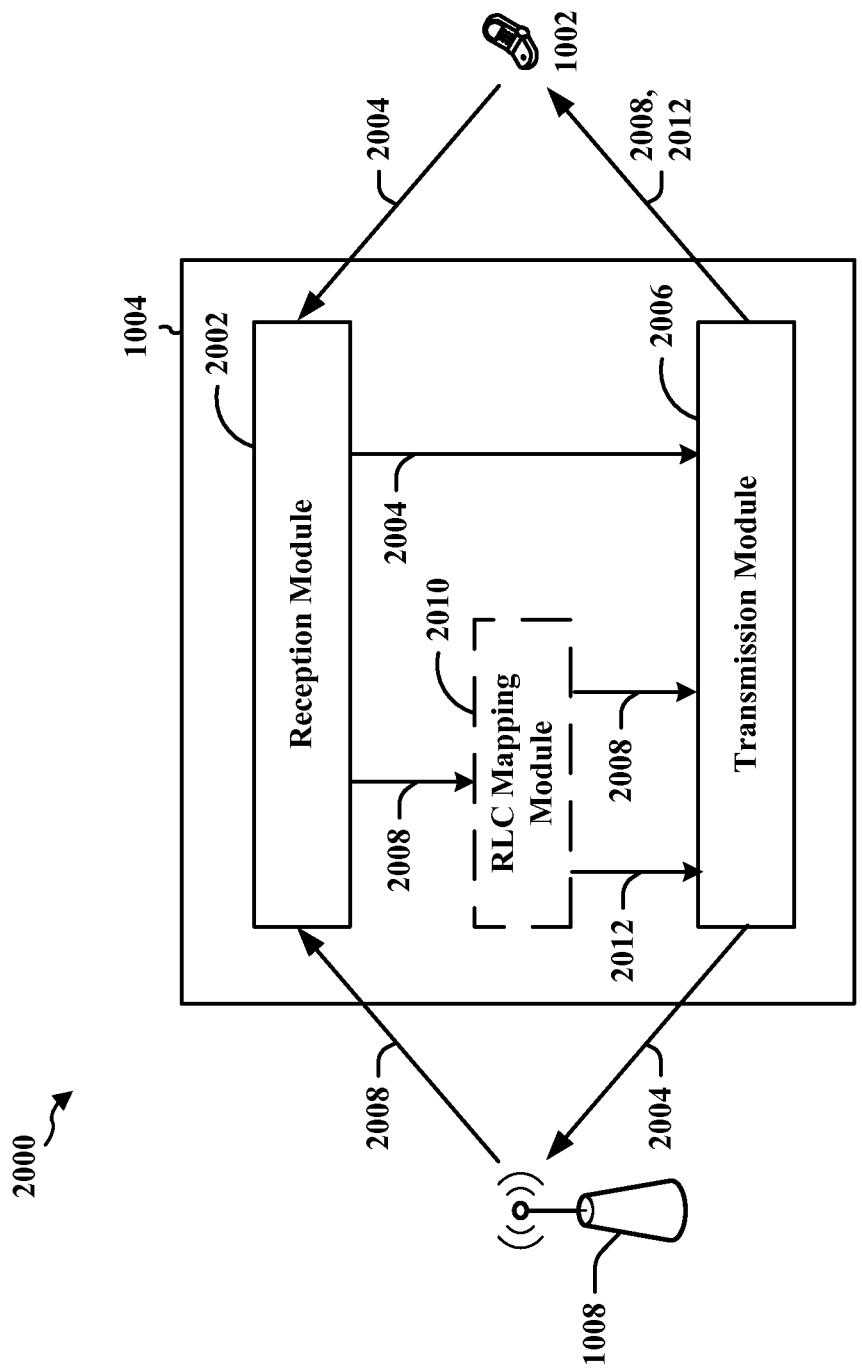
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 1004. The apparatus 1004 includes reception module 2002 that is operable to receive signaling from a UE 1002 and/or one or more other eNBs 1008 that are part of a WAN. Reception module 2002 may receive a handover request 2004 from a first UE 1002. In one aspect, the first UE 1002 may be engaged in D2D communications with a second UE. In one aspect, the handover request may include a peer identifier and a cell identifier associated with the second UE.

The apparatus further includes a transmission module 2006 that is operable to transmit the handover request 2004 to a second eNB 1008 associated with the WAN. Thereafter, reception module 2002 may receive a RLC parameter 2008 from the second eNB 1008. In an optional aspect, apparatus 1004 may further include RLC mapping module 2010. In such an optional aspect, RLC sequence numbering used between the first UE and the first eNB is not the same as RLC sequence numbering used between the second UE and the second eNB. As such, RLC mapping module 2010 may map a received RLC parameter 2008 to a RLC parameter recognizable 2012 by a first UE 1002. Thereafter, the RLC parameter 2008 and/or the mapped RLC parameter value 2012 may be transmitted to UE 1002 using transmission module 2006.

The apparatus may include additional modules that perform each of the steps of the algorithm in the aforementioned flow chart FIG. 19. As such, each step in the aforementioned flow chart FIG. 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
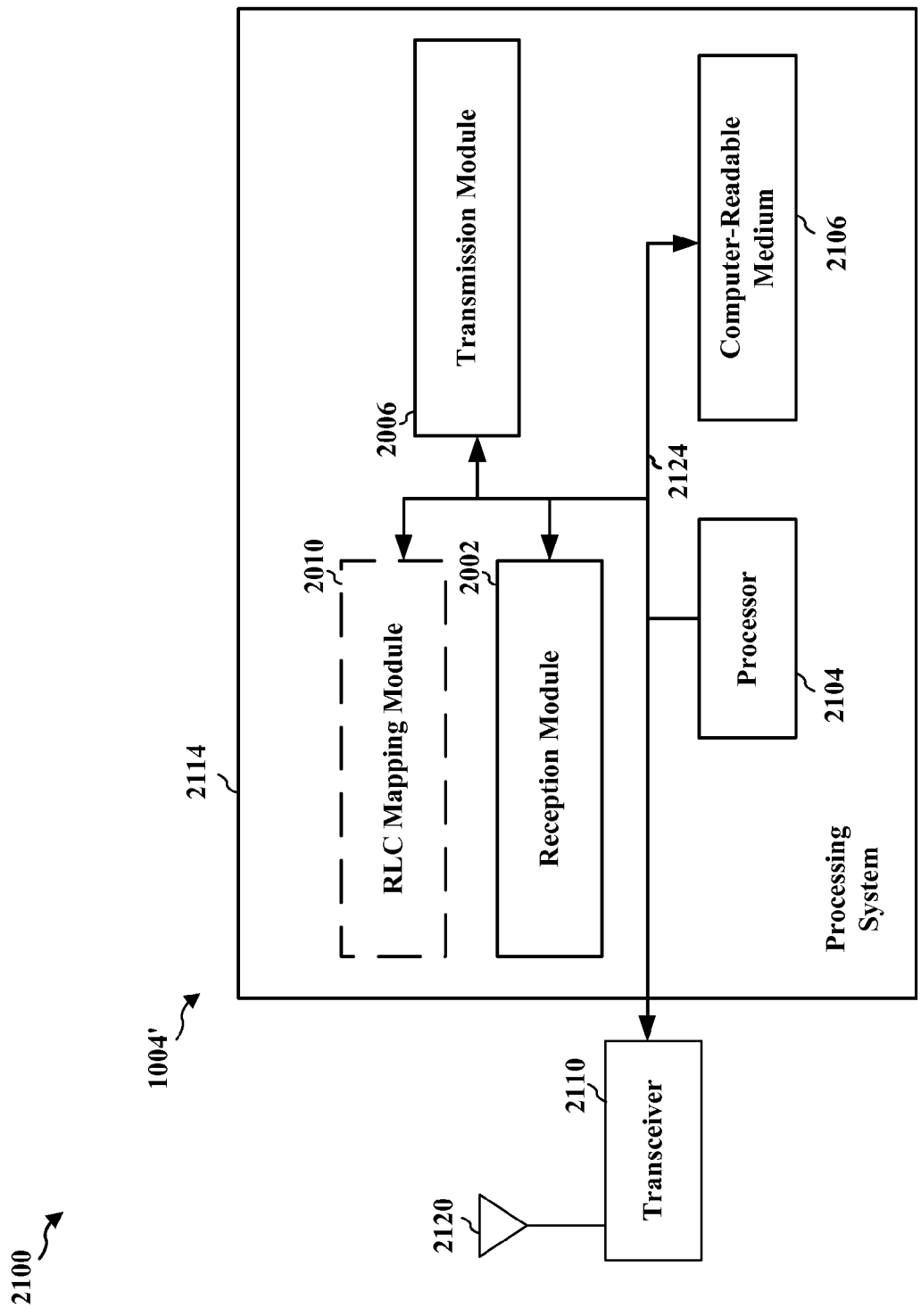
FIG. 21 is a diagram illustrating an example of a hardware implementation for an apparatus employing a processing system.

FIG. 21 is a diagram illustrating an example of a hardware implementation for an apparatus 1004' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2002, 2006, optional module 2010, and the computer-readable medium 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes at least one of the modules 2002, 2006, and optional module 2010. The modules may be software modules running in the processor 1704, resident/stored in the computer readable medium 2106, one or more hardware modules coupled to the processor 2104, or some combination thereof.

In one configuration, the apparatus 1004/1004' for wireless communication includes means for receiving, by a first eNB, a handover request from a first UE, where the handover request includes a peer identifier and a cell identifier associated with a second UE, and where the first UE and second UE are engaged in device to device (D2D) communications, means for transmitting the handover request to a second eNB associated with the second UE, means for receiving a radio link control (RLC) sequence number indicating a last successful reception by the second UE, and means for transmitting the RLC sequence number to the first UE. In one aspect, apparatus 1004/1004' may include means for determining, for a set of resources allocated for D2D communications by the second eNB, a preference order for one or more subsets of resources to be used for D2D communications, and means for transmitting the preference order of the one or more subsets of resources. In such an aspect, apparatus 104/104' may include means for signaling between the first eNB and the second eNB using an X2 interface.

The aforementioned means may be one or more of the aforementioned modules of the apparatus 1004 and/or the processing system 2114 of the apparatus 1004' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   transmitting, by a first UE, a wide area network (WAN) handover request to an eNB associated with the first UE, wherein the WAN handover request includes a peer identifier associated with a second UE and includes a cell identifier of a second eNB associated with the second UE, and wherein the first UE and the second UE are in a connected state engaged in direct device to device (D2D) communications;
   receiving, by the first UE via the eNB and the second eNB, a radio link control (RLC) parameter indicating a last successful reception by the second UE;
   determining, by the first UE, a subsequent content item to be communicated to the second UE based on the received RLC parameter; and
   transmitting, by the first UE, the subsequent content item to the second UE via the eNB and the second eNB.

2. The method of claim 1, wherein the RLC parameter comprises a RLC sequence number, and wherein the receiving comprises receiving the RLC sequence number from the second UE via the eNB.

3. The method of claim 1, wherein the RLC parameter comprises a RLC acknowledgement, and wherein the receiving comprises receiving the RLC acknowledgment from the second UE via the direct D2D communications.

4. The method of claim 1, wherein the transmitting further comprises transmitting using radio resource control (RRC) signaling.

5. A method of communications, comprising:
- receiving, by a first eNB, a handover request from a first UE, wherein the handover request includes a peer identifier associated with a second UE and includes a cell identifier of a second eNB associated with the second UE;
- transmitting, by the first eNB, the handover request to the second eNB associated with the second UE;
- receiving, by the first eNB from the second eNB, a radio link control (RLC) sequence number indicating a last successful reception by the second UE;
- transmitting, by the first eNB, the RLC sequence number to the first UE;
- receiving, by the first eNB, a subsequent content item for the second UE from the first UE based on the transmitting of the RLC sequence number; and
- transmitting, by the first eNB, the subsequent content item to the second eNB.

6. The method of claim 5, wherein the transmitting from the first eNB to the second eNB comprises signaling using an X2 interface.

7. The method of claim 5, wherein RLC sequence numbering used between the first UE and the first eNB is the same as RLC sequence numbering used between the second UE and the second eNB.

8. The method of claim 5, wherein the receiving from the second eNB further comprises mapping from RLC sequences numbers used between the second UE and the second eNB to RLC sequences numbers used between the first UE and the first eNB.

9. An apparatus for wireless communication, comprising:
- means for transmitting, by the apparatus, a wide area network (WAN) handover request to an eNB, wherein the WAN handover request includes a peer identifier associated with a UE and a cell identifier of a second eNB associated with the UE, and wherein the apparatus and the UE are in a connected state engaged in direct device to device (D2D) communications;
- means for receiving, by the apparatus via the eNB and the second eNB, a radio link control (RLC) parameter indicating a last successful reception by the UE;
- means for determining, by the apparatus, a subsequent content item to be communicated based on the received RLC parameter; and
- means for transmitting, by the apparatus, the subsequent content item to the UE via the eNB and the second eNB.

10. The apparatus of claim 9, wherein the RLC parameter comprises a RLC sequence number, and wherein the means for receiving is configured to receive the RLC sequence number from the UE via the eNB.

11. The apparatus of claim 9, wherein the RLC parameter comprises a RLC acknowledgement, and wherein the means for receiving is configured to receive the RLC acknowledgment from the UE via the direct D2D communications.

12. The apparatus of claim 9, wherein the means for transmitting is configured to transmit using radio resource control (RRC) signaling.

13. An apparatus for wireless communication, comprising:
- means for receiving, by the apparatus, a handover request from a first UE, wherein the handover request includes a peer identifier associated with a second UE and a cell identifier of an eNB associated with the second UE, and wherein the first UE and the second UE are engaged in device to device (D2D) communications;
- means for transmitting, by the apparatus, the handover request to the eNB associated with the second UE;
- means for receiving, by the apparatus from the eNB, a radio link control (RLC) sequence number indicating a last successful reception by the second UE;
- means for transmitting, by the apparatus, the RLC sequence number to the first UE;
- means for receiving, by the apparatus, a subsequent content item for the second UE from the first UE based on the transmitting of the RLC sequence number; and
- transmitting, by the apparatus, the subsequent content item to the eNB.

14. The apparatus of claim 13, wherein the means for transmitting from the apparatus to the eNB is configured to signal using an X2 interface.

15. The apparatus of claim 13, wherein RLC sequence numbering used between the first UE and the apparatus is the same as RLC sequence numbering used between the second UE and the second eNB.

16. The apparatus of claim 13, wherein the means for receiving from the eNB is configured to map from RLC sequence numbers used between the second UE and the eNB to RLC sequence numbers used between the first UE and the apparatus.

17. An apparatus for wireless communication, comprising:
- a memory; and
- at least one processor coupled to the memory and configured to:
  - transmit, by the apparatus, a wide area network (WAN) handover request to an eNB, wherein the WAN handover request includes a peer identifier associated with a UE and a cell identifier of a second eNB associated with the UE, and wherein the apparatus and the UE are in a connected state engaged in direct device to device (D2D) communications;
  - receive, by the apparatus via the eNB and the second eNB, a radio link control (RLC) parameter indicating a last successful reception by the UE;
  - determine, by the apparatus, a subsequent content item to be communicated based on the received RLC parameter; and
  - transmit, by the apparatus, the subsequent content item to the UE via the eNB and the second eNB.

18. The apparatus of claim 17, wherein the RLC parameter comprises a RLC sequence number, and wherein the at least one processor is further configured to receive the RLC sequence number from the UE via the eNB.

19. The apparatus of claim 17, wherein the RLC parameter comprises a RLC acknowledgement, and wherein the at least one processor is further configured to receive the RLC acknowledgment from the UE via the direct D2D communications.

20. The apparatus of claim 17, wherein the at least one processor is further configured to transmit using radio resource control (RRC) signaling.

21. An apparatus for wireless communication, comprising:
- a memory; and
- at least one processor coupled to the memory and configured to:
  - receive, by the apparatus, a handover request from a first UE, wherein the handover request includes a peer identifier associated with a second UE and a cell identifier of an eNB associated with the second UE, and wherein the first UE and the second UE are engaged in device to device (D2D) communication;
  - transmit, by the apparatus, the handover request to the eNB associated with the second UE;

receive, by the apparatus from the eNB, a radio link control (RLC) sequence number indicating a last successful reception by the second UE;

transmit, by the apparatus, the RLC sequence number to the first UE;

receive, by the apparatus, a subsequent content item for the second UE from the first UE based on the transmitting of the RLC sequence number; and transmit, by the apparatus, the subsequent content item to the eNB.

22. The apparatus of claim 21, wherein the at least one processor is further configured to signal using an X2 interface.

23. The apparatus of claim 21, wherein RLC sequence numbering used between the first UE and the apparatus is the same as RLC sequence numbering used between the second UE and the eNB.

24. The apparatus of claim 21, wherein the at least one processor is further configured to map from RLC sequence numbers used between the second UE and the eNB to RLC sequence numbers used between the first UE and the apparatus.

25. A non-transitory computer-readable medium storing computer executable code for wireless communication of a first UE, comprising code for:

transmitting, by the first UE, a wide area network (WAN) handover request to an eNB, wherein the WAN handover request includes a peer identifier associated with a second UE and a cell identifier of a second eNB associated with the second UE, and wherein the first UE and the second UE are in a connected state engaged in direct device to device (D2D) communications;

receiving, by the first UE via the eNB and the second eNB, a radio link control (RLC) parameter indicating a last successful reception by the second UE;

determining, by the first UE, a subsequent content item to be communicated to the second UE based on the received RLC parameter; and transmitting, by the first UE, the subsequent content item to the second UE via the eNB and the second eNB.

26. A non-transitory computer-readable medium storing computer executable code for wireless communication of a first eNB, comprising code for:

receiving, by the first eNB, a handover request from a first UE, wherein the handover request includes a peer identifier associated with a second UE and a cell identifier of a second eNB associated with the second UE, and wherein the first UE and second UE are engaged in device to device (D2D) communications;

transmitting, by the first eNB, the handover request to the second eNB associated with the second UE;

receiving, by the first eNB from the second eNB, a radio link control (RLC) sequence number indicating a last successful reception by the second UE;

transmitting, by the first eNB, the RLC sequence number to the first UE;

receiving, by the first eNB, a subsequent content item for the second UE from the first UE based on the transmitting of the RLC sequence number; and transmitting, by the first eNB, the subsequent content item to the second eNB.

\* \* \* \* \*